US012388202B2

(12) United States Patent
Herzog et al.

(10) Patent No.: US 12,388,202 B2
(45) Date of Patent: Aug. 12, 2025

(54) SPACE-EFFICIENT STRUCTURES FOR MULTI-PORT POWER ADAPTERS

(71) Applicant: Apple Inc., Cupertino, CA (US)

(72) Inventors: Adam H. Herzog, Los Altos, CA (US); Cesar Lozano Villarreal, Campbell, CA (US); Johnathan D. Simeroth, San Jose, CA (US); Mahmoud R. Amini, Sunnyvale, CA (US); Mathieu P. Roy, Sunnyvale, CA (US); Michael J. Reis, San Jose, CA (US); Patrick M. DalCanto, San Jose, CA (US); Rui Zhou, Sunnyvale, CA (US); Sharif S. Chang, Cupertino, CA (US); Shayla Schoensee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 17/832,663

(22) Filed: Jun. 5, 2022

(65) Prior Publication Data

US 2023/0108190 A1 Apr. 6, 2023

Related U.S. Application Data

(60) Provisional application No. 63/248,295, filed on Sep. 24, 2021.

(51) Int. Cl.
*H01R 12/52* (2011.01)
*H01R 12/58* (2011.01)
(Continued)

(52) U.S. Cl.
CPC ............. *H01R 12/52* (2013.01); *H01R 12/58* (2013.01); *H01R 13/08* (2013.01); *H01R 13/506* (2013.01); *H01R 31/065* (2013.01)

(58) Field of Classification Search
CPC ........ H01R 12/52; H01R 12/58; H01R 13/08; H01R 31/065; H01R 12/91; H05K 3/4092; H05K 3/326
(Continued)

(56) References Cited

U.S. PATENT DOCUMENTS 8,014,165 B2 * 9/2011 Hamner ............. H01R 13/6582 361/776
9,024,581 B2 * 5/2015 McGinley ............. H02J 7/0042 320/111
(Continued)

FOREIGN PATENT DOCUMENTS

JP 2021108286 A 7/2021
WO 2021184241 A1 9/2021

OTHER PUBLICATIONS

U.S. Appl. No. 17/832,665 , Non-Final Office Action, Mailed On Jun. 15, 2023, 17 pages.
(Continued)

*Primary Examiner* — Renee S Luebke
*Assistant Examiner* — Paul D Baillargeon
(74) *Attorney, Agent, or Firm* — Kilpatrick Townsend & Stockton LLP

(57) ABSTRACT

Power adapters having a small-form factor, can deliver a large amount of power, can charge multiple electronic devices, and can allocate power between the multiple electronic devices in an efficient manner. One example can provide power adapters having small form factor that can be achieved by including space-efficient structures. This example can have an enclosure with first openings for power prongs, a second opening for a first connector receptacle, and a third opening for a second connector receptacle. An alignment adapter can be electromagnetically located between the power prongs and the first connector receptacle and between the power prongs and the second connector
(Continued)

receptacle. The alignment adapter can include a compensating feature to allow each of the power prongs to be aligned with corresponding first openings, the first connector receptacle to be aligned with the second opening, and the second connector receptacle to be aligned with the third opening.

19 Claims, 19 Drawing Sheets

(51) Int. Cl.
*H01R 13/08* (2006.01)
*H01R 13/506* (2006.01)
*H01R 31/06* (2006.01)

(58) Field of Classification Search
USPC ........................................................ 361/776
See application file for complete search history.

(56) References Cited

U.S. PATENT DOCUMENTS

| | | | | |
|---|---|---|---|---|
| 9,236,699 | B2 * | 1/2016 | Lai | H01R 13/665 |
| 9,914,548 | B1 | 3/2018 | Vadillo | |
| 10,819,111 | B2 | 10/2020 | Wang et al. | |
| 11,314,307 | B2 | 4/2022 | Santini et al. | |
| 11,489,296 | B2 * | 11/2022 | Li | H01R 12/721 |
| 11,516,929 | B2 | 11/2022 | Dvorak et al. | |
| 11,656,593 | B2 | 5/2023 | Donnig et al. | |
| 11,757,241 | B2 * | 9/2023 | Liao | H01R 31/065 439/76.1 |
| 2014/0192494 | A1 * | 7/2014 | Liang | G06F 1/1658 361/752 |
| 2014/0325245 | A1 | 10/2014 | Santini et al. | |
| 2015/0160674 | A1 | 6/2015 | Burdette et al. | |
| 2015/0311656 | A1 | 10/2015 | Lai | |
| 2016/0336745 | A1 | 11/2016 | Pandya et al. | |
| 2017/0237266 | A1 | 8/2017 | Hatakeyama | |
| 2017/0358947 | A1 | 12/2017 | Waters et al. | |
| 2018/0120910 | A1 | 5/2018 | Farkas et al. | |
| 2018/0284866 | A1 | 10/2018 | Sakai et al. | |
| 2018/0323626 | A1 | 11/2018 | Suen et al. | |
| 2018/0375357 | A1 | 12/2018 | Sultenfuss et al. | |
| 2019/0207349 | A1 | 7/2019 | Yuan et al. | |
| 2019/0238705 | A1 | 8/2019 | Shimamura et al. | |
| 2019/0267817 | A1 | 8/2019 | Weissinger | |
| 2020/0012326 | A1 | 1/2020 | Steele et al. | |
| 2020/0067307 | A1 | 2/2020 | Mlmaz et al. | |
| 2020/0091758 | A1 | 3/2020 | Jahan et al. | |
| 2020/0209933 | A1 | 7/2020 | Shimamura et al. | |
| 2021/0103539 | A1 | 4/2021 | Woodbury et al. | |
| 2021/0167623 | A1 | 6/2021 | Sanghvi et al. | |
| 2021/0191486 | A1 | 6/2021 | Chen | |
| 2021/0234393 | A1 | 7/2021 | Sultenfuss et al. | |
| 2022/0173605 | A1 | 6/2022 | Kumar | |
| 2023/0108190 | A1 | 4/2023 | Herzog et al. | |

OTHER PUBLICATIONS

Korean Patent Application No. 10-2022-0109981 , "Office Action", Apr. 19, 2024, 5 pages.

* cited by examiner

SPACE-EFFICIENT STRUCTURES FOR MULTI-PORT POWER ADAPTERS

CROSS-REFERENCES TO RELATED APPLICATIONS

This application claims the benefit of U.S. provisional patent application No. 63/248,295, filed Sep. 24, 2021, which is incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors and other display devices, power adapters, and others, have become ubiquitous.

Many of these are portable devices that have an internal battery that allows users the freedom to carry and use them wherever they go. The internal batteries in these portable devices can be charged through a cable connected to a power adapter, which can convert AC power at a wall outlet to DC power that can be used by the portable device to charge its internal batteries.

Users often need to take these power adapters with them, particularly when traveling or spending an extensive time away. For this and other reasons, it can be desirable that these power adapters have a small form factor. But some of these portable electronic devices can have large internal batteries, and users might want to charge these batteries quickly. For example, they might have only a limited time to access a wall outlet before needing to leave. Accordingly, it can be desirable that these power adapters be able to provide a great deal of power despite their limited size.

Users also often have more than one device that needs to be charged. For example, they might want to work on a laptop while charging a phone. Accordingly, it can be desirable that a power adapter be able to charge more than one device at a time. But in some circumstances, one device might need more power than another device being simultaneously charged. Therefore, it can be desirable that a power adapter be able to allocate power between the multiple electronic devices in an efficient manner.

Thus, what is needed are power adapters having a small form factor, are capable of delivering a large amount of power, can charge multiple electronic devices, and can allocate power among the multiple electronic devices in an efficient manner.

SUMMARY

Accordingly, embodiments of the present invention can provide power adapters having a small form factor, are capable of delivering a large amount of power, can charge multiple electronic devices, and can allocate power among the multiple electronic devices in an efficient manner.

An illustrative embodiment of the present invention can provide power adapters having small form factor. The small form factor can be achieved by including space-efficient structures that can provide a large amount of functionality in a small volume. A power adapter can have an enclosure with first openings for power prongs, a second opening for a first connector receptacle, and a third opening for a second connector receptacle. The power adapter can include an alignment adapter that is electromagnetically located between the power prongs and the first connector receptacle and between the power prongs and the second connector receptacle. That is, the alignment adapter can be located in the pathway from the power prongs, which receive AC power, through a transformer that converts the AC power to DC power, to the connector receptacles. The alignment adapter can include a compensating feature to allow each of the power prongs to be aligned with corresponding first openings, the first connector receptacle to be aligned with the second opening, and the second connector receptacle to be aligned with the third opening. These power adapters can include additional alignment features that can help to independently align each of the power prongs to internal connections when the power adapter enclosure is assembled.

In these and other embodiments of the present invention, the alignment adapter can be a flexible interposer. The flexible interposer can include a number of contacts having a first end for electrically connecting to a first board and a second end for electrically connecting to a second board. The compensating feature of the alignment adapter can include a first angled portion and a second angled portion on each of the number of contacts, where the first angled portion can form a first acute angle and the second angled portion can form a second acute angle. This configuration for the contacts can provide a flexible interposer that can absorb manufacturing tolerances with a small internal structure.

An alignment adapter such as a flexible interposer can provide additional advantages. For example, the flexible interposer can absorb energy from a physical shock or impact that can be caused by the power adapter being dropped. As an example, since the flexible interposer has an amount of compliance, a shock applied to a connector receptacle can cause a temporary flexing or displacement of the first board relative to the second board. The flexible interposer can absorb this shock, thereby protecting the first board, the second board, and the connection between them, including the flexible interposer itself. Also, the alignment adapter can replace conventional wired connections that can be difficult to implement during assembly, can result in wires being pinched between components, and can consume space inside the power adapter. Instead, a somewhat rigid structure that can simplify assembly of the power adapter can be used. Even though it can be a somewhat rigid structure, the flexible interposer can have a compliance or flexibility. Using a flexible interposer can simplify assembly while providing the compliance necessary to allow proper alignment of the power prongs and connector receptacles to openings of the power adapter and to be able to absorb physical shock to the power adapter.

The additional alignment features that are used to ensure a connection between the power prongs and internal connections when the power adapter enclosure is assembled can also provide additional advantages. Similar to the alignment adapter, the additional alignment features can have a compliance that can absorb energy from a physical shock, such as when the power adapter is kicked when plugged into a wall outlet. This compliance can give the additional alignment features the ability to absorb energy without breaking internal connections to the power prongs. Also, the additional alignment features can replace conventional wired connections that can be difficult to implement during assembly. Instead, a somewhat rigid structure that can simplify assembly of the power adapter can be used. Even though it can be a somewhat rigid structure, the additional alignment features can have a compliance or flexibility. Using these additional alignment features can simplify assembly while providing the compliance necessary to allow proper alignment of the power prongs to internal connections when the power adapter enclosure is assembled and to be able to absorb physical shock to the power adapter.

These and other embodiments of the present invention can provide an enclosure for an electronic device, where the enclosure includes a top portion having an outer edge. The top portion can include a top surface and a number of snaps, where each snap extends from the top surface. The enclosure can also include a sidewall to fit with the outer edge of the top surface. The sidewall can have an inner surface with a number of hoops along the inner surface. Each hoop can be substantially parallel to and separate from the inner surface of the sidewall. Each snap can be positioned and shaped to fit in a corresponding hoop. Each snap can include a tab at a second end of the snap away from the top portion of the enclosure. During assembly, each tab can enter a top of a corresponding hoop and emerge from a bottom of the hoop as the top portion and the sidewall of the enclosure are joined. The tab can help to keep the snap in place in the hoop. The enclosure can further include a bottom portion including a bottom surface and the sidewall, wherein the top portion and the bottom portion at least substantially enclose the electronic device.

This hoop and snap configuration can help to secure the top portion of the enclosure to the bottom portion of the enclosure. The hoops and snaps can also provide reinforcement for the enclosure. Additional measures can be implemented to further bolster the enclosure. For example, the first connector receptacle can include a first tab and a second tab and the second connector receptacle can include a third tab and a fourth tab. The first tab, the second tab, the third tab, and the fourth tab can be positioned against an inside surface of the enclosure to provide reinforcement for the enclosure.

In these and other embodiments of the present invention, the power prongs can be fixed to the top portion of the enclosure, while the first connector receptacle and second connector receptacle can be fixed to the bottom portion of the enclosure. During assembly, as the snaps of the top portion of the enclosure are inserted into the hoops of the bottom enclosure, connections between the power prongs and other internal circuits and components can be formed. For example, a power adapter can include an enclosure comprising a top portion and a bottom portion. The bottom portion can have a bottom surface and a sidewall extending from the bottom surface to the top portion. A board in the enclosure can be parallel to the bottom surface, the board having a bottom side facing the bottom surface of the bottom portion of the enclosure. A header can be located on the top side of the board and can support a number of first terminals on a bottom side of the header and attached to a top side of the board. A second terminal can be attached to a top side of the header. A first spring contact can connect to a first power prong at a first end and can extend to a second end that can connect to the second terminal. A third terminal can be attached to a top side of the header. A second spring contact can connect to a second power prong at a first end and can extend to a second end that can connect to the third terminal.

During assembly, when the top portion of the enclosure is mated with the bottom portion of the enclosure, the second end of the first spring contact can physically and electrically connect to the second terminal, while the second end of the second spring contact can physically and electrically connect to the third terminal. The second end of the first spring contact and the second terminal can be configured such that during assembly, when the top portion of the enclosure is mated with the bottom portion of the enclosure, the second end of the first spring contact physically and electrically connects to the second terminal without intervention. The second end of the first spring contact can be formed as a narrowing portion. The second terminal can be formed to have a dove-tailed or funnel opening to accept the narrowing portion of the second end of the first spring contact. The second end of the second spring contact and the third terminal can be similarly configured.

During assembly as well as during use, a holder can be used to secure the first spring contact and the second spring contact in place in the top portion of the enclosure. The holder can be held in place using interlocking or retention features in the top portion of the enclosure. In these and other embodiments of the present invention, the holder can be formed of a material that can maintain form at high temperatures. The holder can be formed of a nonconductive material such as a thermoplastic that has a high heat-deflection temperature and flammability rating. For example, the holder can be formed of a liquid crystal polymer, polyimide film, polycarbonate film, a thermoset such as a phenolic plastic, or other material.

These and other embodiments of the present invention can provide support structures that can help to reduce the size of a power adapter and help the power adapter provide a large amount of power. For example, a header can be included, where the header can support a number of components and interconnect lines. The header can connect to the first board through a number of first terminals. The interconnect lines can connect the components, the first terminals, the second terminal, and the third terminal.

These and other embodiments of the present invention can provide components shaped to efficiently utilize space inside a power adapter. For example, the components can include an inductor comprising windings having a toroid shape. A core can be positioned around the windings. The core can have rectangular cuboid outside surface. A housing supporting a bus-bar can be included. A first end of the bus-bar can be connected to a wire in the windings and the second end of the bus-bar can be a terminal connected to an interconnect line on the header.

In these and other embodiments of the present invention, a power adapter can provide power to multiple devices connected at multiple connector receptacles. The power adapter can provide a maximum amount of power without overheating. Accordingly, it can be desirable to allocate this maximum power among multiple electronic devices being charged by the power adapter.

In these and other embodiments of the present invention, it can be desirable that power be distributed among the connected electronic devices in a consistent manner. For example, the power adapter can provide power to a first electronic device and a second electronic device in a consistent manner independent of an order of connection of the first electronic device and the second electronic device to the power adapter. This is particularly useful when two electronic devices are connected to the power adapter and then the power adapter is plugged into a wall outlet or other power source.

When allocating power independently of connection order might not be possible, the power adapter can prioritize power by order of connection to the power adapter. This can be useful where two electronic devices that do not have internal batteries are connected to the power adapter. Since these two electronic devices do not have internal batteries, they might need to be continuously powered by the power adapter for proper operation. The power adapter can allocate one-half the maximum power to each of these electronic devices. However, if the two devices combined require more than the maximum power, then the power adapter can allocate the needed power to the first connected electronic device and provide the second electronic device with enough power to operate in a low-power state. The power adapter can take other factors into account in allocating power among multiple devices. For example, additional power can be directed towards a device that has a low battery level and directed away from a device that has a fully charged battery level.

The components of these power adapters can be formed of various materials. For example, the power prongs, contacts, protective covers, tabs, spring contacts, terminals, bus-bars, and their constituent parts and other conductive portions of the power adapters can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as the enclosure, housings, header, and their constituent parts and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesives can be a pressure sensitive adhesive, heat activated film, polyimide film, or other adhesive. The boards can be flexible circuit boards or printed circuit boards and can be formed of FR-4 or other material.

Embodiments of the present invention can provide power adapters having connector receptacles that can accept connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
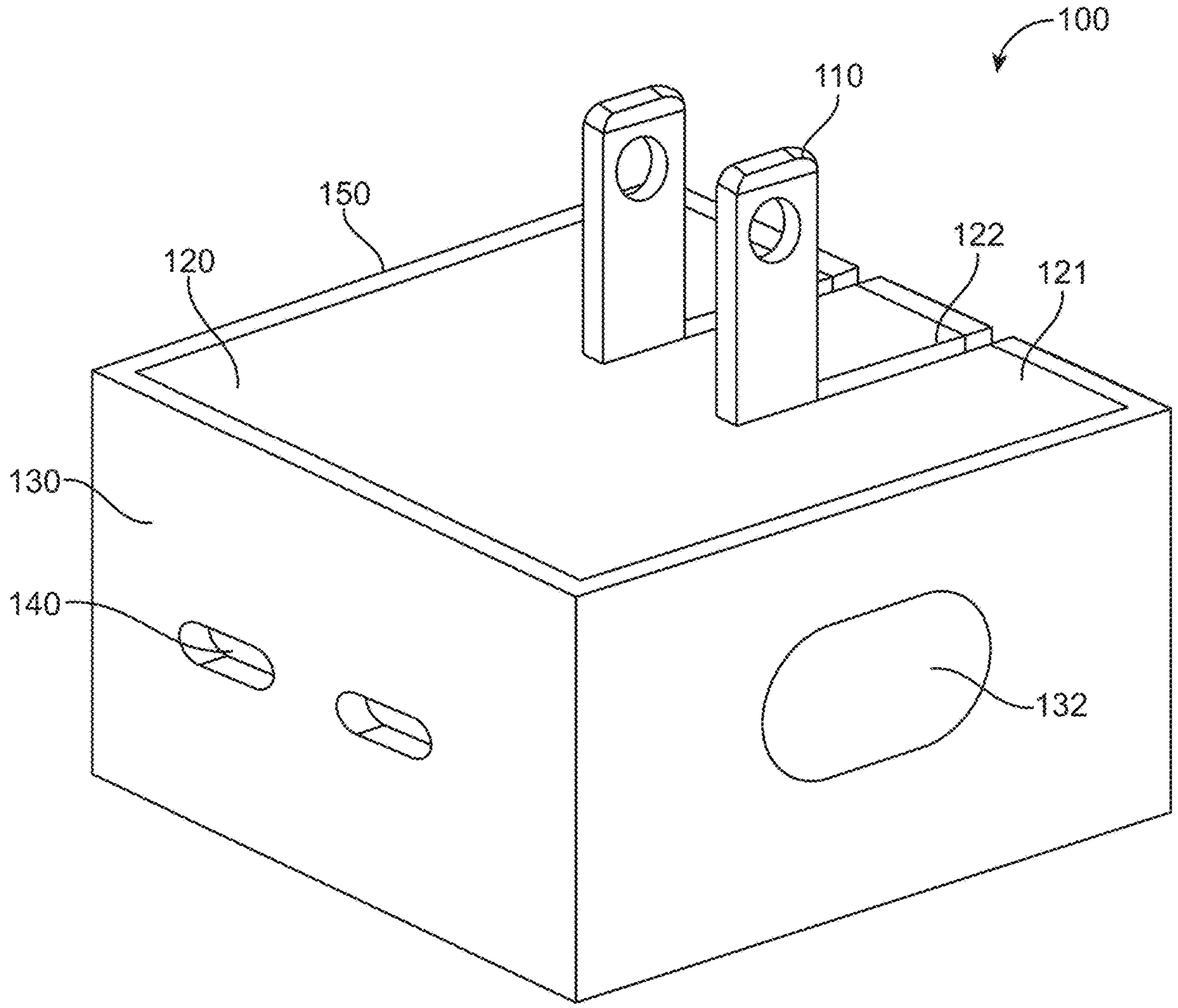
FIG. 1 illustrates a power adapter according to an embodiment of the present invention.

FIG. 1 illustrates a power adapter according to an embodiment of the present invention. This figure, as with the other included figures, is shown for illustrative purposes and does not limit either the possible embodiments of the present invention or the claims.

Power adapter 100 can be housed in enclosure 150 comprising top portion 120 and bottom portion 130. Bottom portion 130 can include recessed areas 132, which can be used when inserting power adapter 100 into a wall outlet. Power adapter 100 can include power prongs 110 for receiving power from a wall outlet or other source. In these and other embodiments of the present invention, power prongs 110 can have various shapes for compliance with wall outlets in different regions. Different numbers of power prongs 110 can also be implemented. For example, prongs for power (hot), neutral, and ground can be included. Power prongs 110 can be folded into slots or openings 122 to facilitate conveyance. Power prongs 110 can extend from a top surface 121 as shown for mating with a wall outlet or other power source. Power adapter 100 can include one or more connector receptacles 530 (shown in FIG. 5) at openings 140. While power adapter 100 is shown as including two connector receptacles 530 and openings 140, power adapter 100, and the other power adapters provided by embodiments of the present invention, can provide one, two, three, or more than three connector receptacles 530 and openings 140. Connector receptacles 530 can be compliant with USB, USB Type-C, or other proprietary or standard connection. Power adapter 100 can receive AC power from an outlet at power prongs 110 and provide DC power to charge multiple devices using multiple connector receptacles 530.

During manufacturing, components and structures internal to power adapter 100 can have various manufacturing tolerances. These manufacturing tolerances can make it difficult to simultaneously align power prongs 110 to openings 122 and connector receptacles 530 to openings 140. Accordingly, embodiments of the present invention can include an alignment adapter. This alignment adapter can be located electromagnetically between power prongs 110 and connector receptacles 530. That is, the alignment adapter can be located in the pathway from power prongs 110, which receive AC power, through a transformer that converts the AC power to DC power, to connector receptacles 530. This alignment adapter can absorb manufacturing tolerances such that power prongs 110 can be aligned to openings 122 and connector receptacles 530 can be aligned to openings 140. The alignment adapter can replace conventional wired connections with a somewhat rigid structure that can simplify assembly of the power adapter 100. Even though it can be a somewhat rigid structure, the alignment adapter can have a compliance or flexibility. The alignment adapter can include a compensating feature, where the compensating feature provides flexibility for the alignment adapter. Power adapter 100 can further include additional alignment features that can help to independently align each of the power prongs 110 to internal connections. Examples are shown in the following figures.

Figure 2:
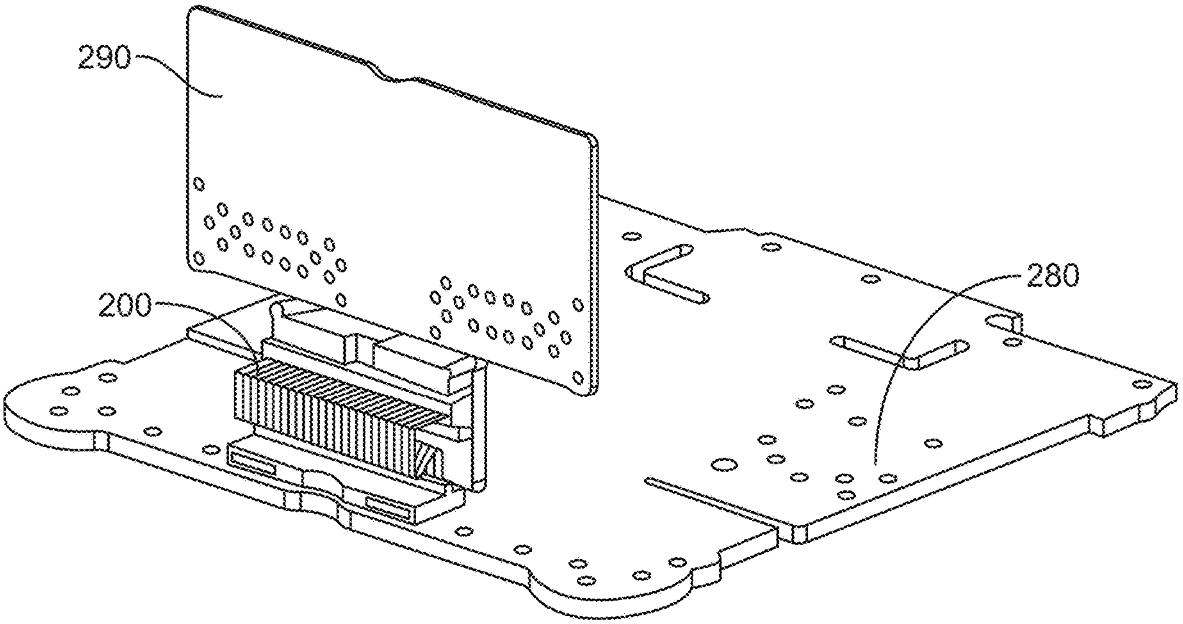
FIG. 2 illustrates portions of a power adapter according to an embodiment of the present invention.

FIG. 2 illustrates portions of a power adapter according to an embodiment of the present invention. A first board 280 can be electrically connected to a second board 290 through an alignment feature, which in this implementation can be flexible interposer 200. First board 280 and second board 290 can be flexible circuit boards, printed circuit boards, or other appropriate substrates. Power prongs 110 (shown in FIG. 1) and first board 280 can be fixed in position relative to bottom portion 130 of enclosure 150 for power adapter 100 (shown in FIG. 1.) Connector receptacles 530 (shown in FIG. 5) can be fixed in position on second board 290. Flexible interposer 200 can allow for relative movement between first board 280 and second board 290. This can allow power prongs 110 and connector receptacle 530 to be aligned their respective openings, openings 122 and openings 140 (shown in FIG. 1.) Put another way, first board 280 can be aligned to bottom portion 130 and connector receptacles 530 on second board 290 can align to openings 140. Flexible interposer 200 can compensate for variations in the relative positions of first board 280 and second board 290.

An alignment adapter such as flexible interposer 200 can provide additional advantages. For example, flexible interposer 200 can absorb energy from a physical shock or impact that can be caused by power adapter 100 being dropped. As an example, by having an amount of compliance, a shock applied to connector receptacles 530 can cause a temporary flexing or displacement of first board 280 relative to second board 290. The flexible interposer 200 can absorb this shock, thereby protecting first board 280, second board 290, and the connection between them, including flexible interposer 200 itself. Additional alignment features shown below can absorb shock, for example at the power prongs. These additional alignment features can also have a compliance that can absorb energy from a physical shock, such as when the power adapter is kicked when plugged into a wall outlet. This compliance can give the additional alignment features the ability to absorb energy without breaking internal connections to the power prongs. Also, flexible interposer 200 can replace conventional wired connections that can be difficult to implement during assembly, can result in wires being pinched between components, and can consume space inside power adapter 100. Instead, a somewhat rigid structure that can simplify assembly of the power adapter can be used. Even though it can be a somewhat rigid structure, flexible interposer 200 can have a compliance or flexibility. Using flexible interposer 200 can simplify assembly while providing the compliance necessary to allow proper alignment of power prongs 110 to openings 122 and connector receptacles 530 to openings 140 of power adapter 100 and to be able to absorb physical shocks to power adapter 100. Further details of flexible interposer 200 are shown in the following figures.

Figure 3B:
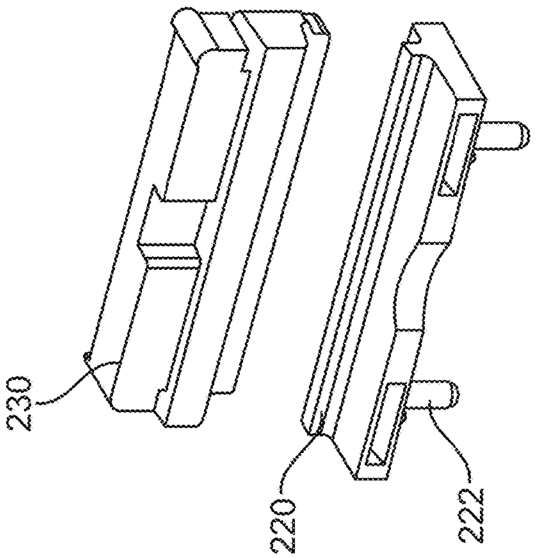
FIG. 3A through FIG. 3C illustrate portions of a flexible interposer according to an embodiment of the present invention.
Figure 3C:
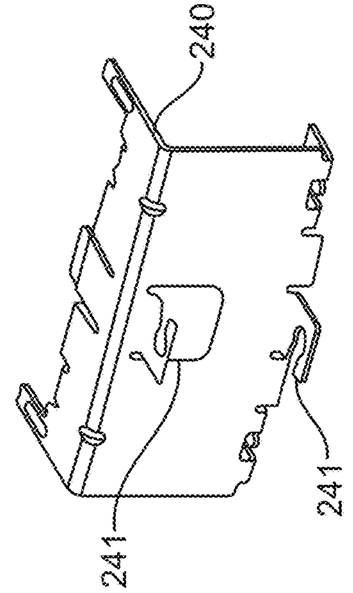
Figure 3A:
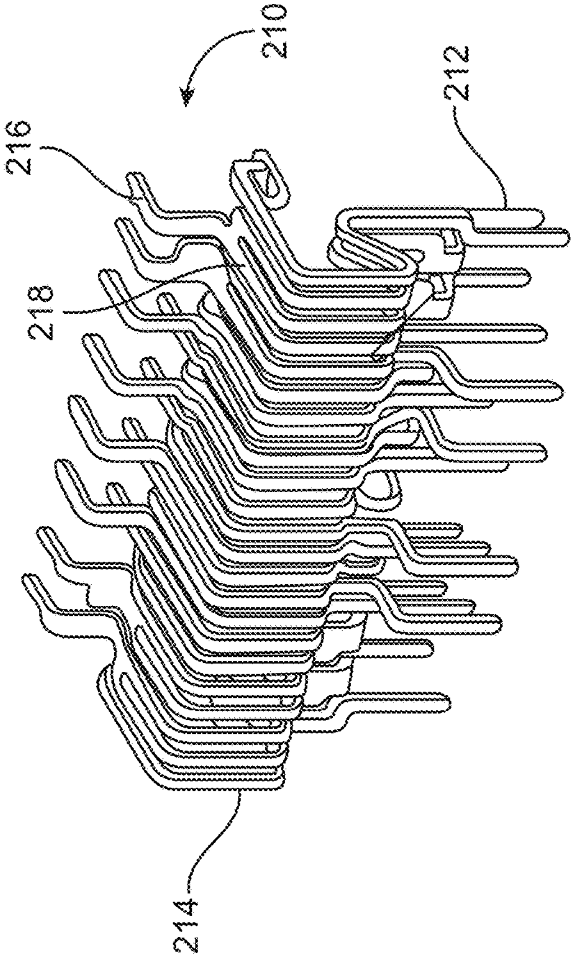

FIG. 3A through FIG. 3C illustrate portions of a flexible interposer according to an embodiment of the present invention. In FIG. 3A, contacts 210 can include contact body 214 having first ends 212 and second ends 216. First ends 212 and second ends 216 can be orthogonal to each other. First ends 212 and second ends 216 can be through-hole contacting portions to fit in openings in first board 280 and second board 290 respectively. In these and other embodiments of the present invention, one or more contacts 210 can include split portions 218. These split portions 218 can provide some contacts 210 with an increased current carrying capability and reduced impedance. This can be particularly of use for power and ground contacts. By providing split portions 218, each of the contacts can bend and flex in a similar way during assembly and operation of power adapter 100.

FIG. 3B illustrate housings that can be used to secure contacts 210 in place relative to each other. For example, first housing 220 can be located around contacts 210 and near first ends 212 such that first ends 212 extend from first housing 220. First housing 220 can include posts 222. Posts 222 can be fit in openings in first board 280. Second housing 230 can be located around contacts 210 towards second ends 216 such that second ends 216 extend from second housing 230.

FIG. 3C illustrates a protective cover 240 that can fit with first housing 220 and second housing 230 to protect flexible interposer 200 during assembly of power adapter 100. Protective cover 240 can be removed after connection of flexible interposer 200 to first board 280 and second board 290 and before the attachment of top portion 120 to bottom portion 130. Protective cover 240 can include tabs 241 that can be used to remove protective cover 240 in a way that does not pull first housing 220 towards second housing 230. For example, a tool can be configured to be aligned with tabs 241 and turned clockwise such that portions of the tool can be positioned between tabs 241 and the rest of protective cover 240. The tool can then be moved away from the flexible interposer thereby removing protective cover 240. Protective cover 240 can be removed during assembly before solder reflow, or protective cover 240 can be removed after solder reflow when flexible interposer 200 is soldered to either or both first board 280 or second board 290.

Figure 4:
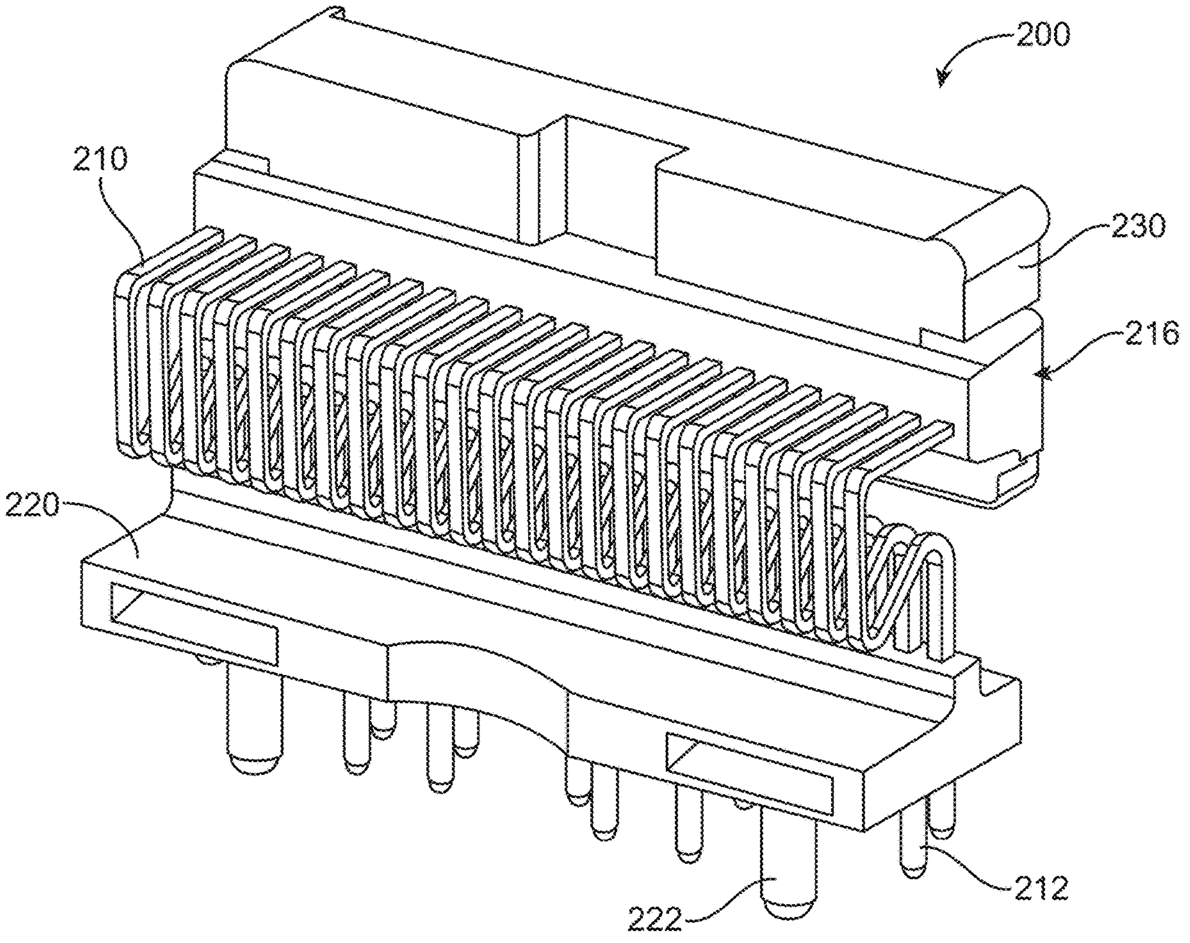
FIG. 4 illustrates a flexible interposer according to an embodiment of the present invention.

FIG. 4 illustrates a flexible interposer according to an embodiment of the present invention. Flexible interposer 200 can include contacts 210. Contacts 210 can be fixed relative to each other by first housing 220 and second housing 230. Contacts 210 can include first ends 212 extending from a bottom of first housing 220, and second ends 216 extending from second housing 230. In this example, first ends 212 and second ends 216 can be through-hole contacting portions. In these and other embodiments of the present invention, some or all of these contact ends can be surface-mount contacting portions (not shown.) First housing 220 can further include posts 222. Posts 222 can be inserted into openings in first board 280 to secure flexible interposer 200 in place. Contacts 210 can provide high-current and low-resistance path for signals between first board 280 and second board 290. Flexible interposer 200 can provide a space efficient alignment structure.

During assembly and operation, contacts 210 can be bent and twisted. To avoid undesired connections among contacts 210, contacts 210 can be coated with a nonconductive layer such as an electrophoretic deposition coating, a parylene coating, or other coating. The contacts can be stainless steel, copper, or other material plated with gold, nickel, palladium, or other material. The plating can be kept thin to avoid peeling due to stress on contacts 210, since the peeled plating material could otherwise cause inadvertent electrical connections. Other layers, such as other insulating or adhesive layers, can be placed on contacts 210 to avoid inadvertent electrical connections.

Figure 5:
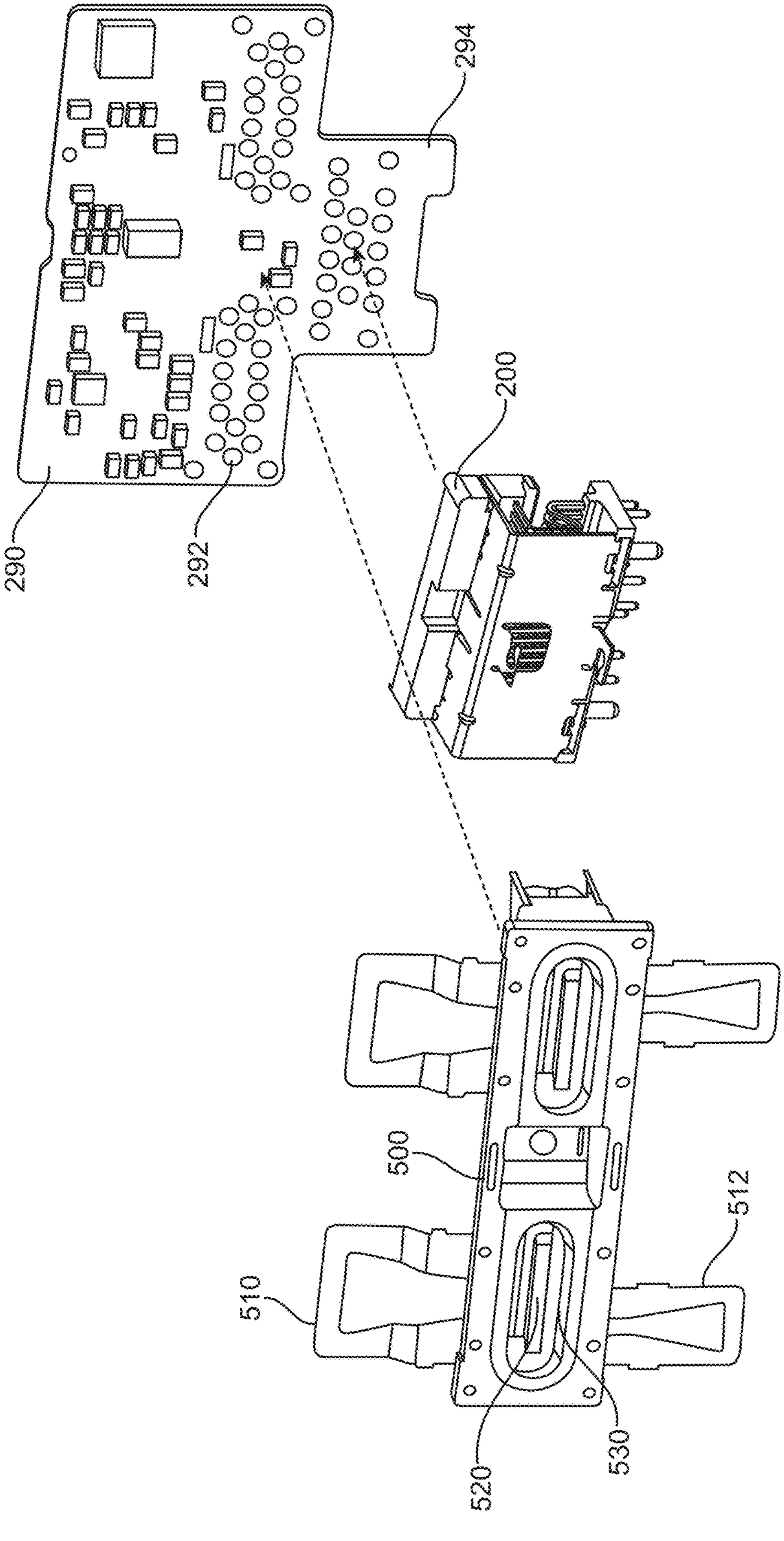
FIG. 5 illustrates a portion of a power adapter according to an embodiment of the present invention.

FIG. 5 illustrates a portion of a power adapter according to an embodiment of the present invention. Second board 290 can include a number of through-hole contacts 292 and through-hole contacts 294. Connector receptacles 530 can include tongue 520 for supporting a number of contacts (not shown.) These contacts can terminate in through-hole contacting portions (not shown) on a backside of connector receptacle assembly 500. These through-hole contacting portions can be inserted into and soldered to through-hole contacts 292 on second board 290. Second ends 216 of contacts 210 (both shown in FIG. 4) of flexible interposer 200 can be inserted into and soldered to through-hole contacts 294 in second board 290.

Connector receptacle assembly 500 can include tabs 510 and tabs 512. Tabs 510 and tabs 512 can be positioned against an inside surface of enclosure 150 (shown in FIG. 1.) Tabs 510 and tabs 512 can be formed of metal and can help to provide reinforcement for enclosure 150. This can be particularly useful where excessive force is applied to a connector insert as it is inserted into connector receptacle 530.

Figure 6:
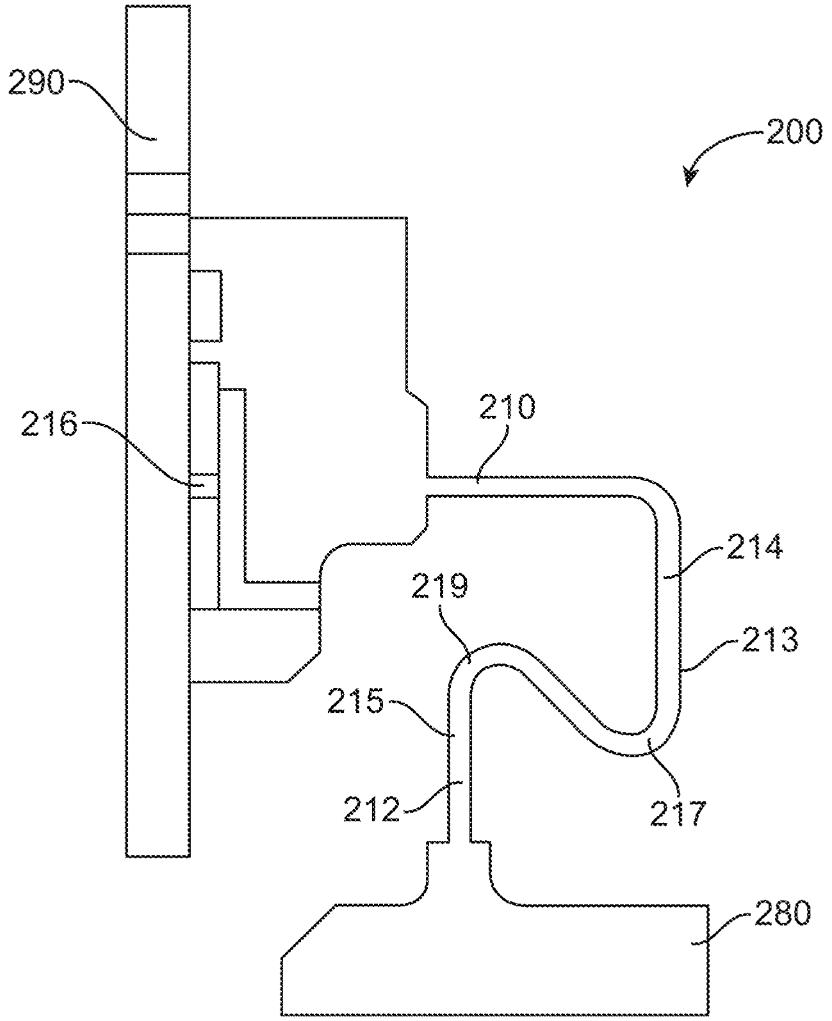
FIG. 6 illustrates a side view of an alignment adapter according to an embodiment of the present invention.

FIG. 6 illustrates a side view of an alignment adapter according to an embodiment of the present invention. In this example, the alignment adapter can be flexible interposer 200. Flexible interposer 200 can include a number of contacts 210 having contact bodies 214. Contacts 210 can include first ends 212 for connecting to first board 280, and second ends 216 for connecting to second board 290. Flexible interposer 200 can include a compensating feature such that flexible interposer 200 can act as alignment adapter. Specifically, contacts 210 can each include a first angled portion 217 and a second angled portion 219. The first angled portion 217 can form a first acute angle. The second angled portion 219 can form a second acute angle. By including these two acute angles, flexible interposer 200 can provide a large amount of angular, lateral, and vertical displacement in a small volume to compensate for manufacturing tolerances in components and structures in power adapter 100. The use of first angled portion 217 and a second angled portion 219 can also provide longer beam lengths for beam portion 215 and beam portion 213. Longer beam portion 215 and beam portion 213 can absorb additional stress and prevent damage to flexible interposer 200 during assembly and operation. That is, longer beam portion 215 and beam portion 213 have a greater length over which to distribute force and stress.

These and other embodiments of the present invention can provide power adapters 100 having small form factors by providing thin enclosures. These thin enclosures can consume a reduced volume in a power adapter, while maintaining a robust strength and durability. Examples are shown in the following figures.

Figure 7:
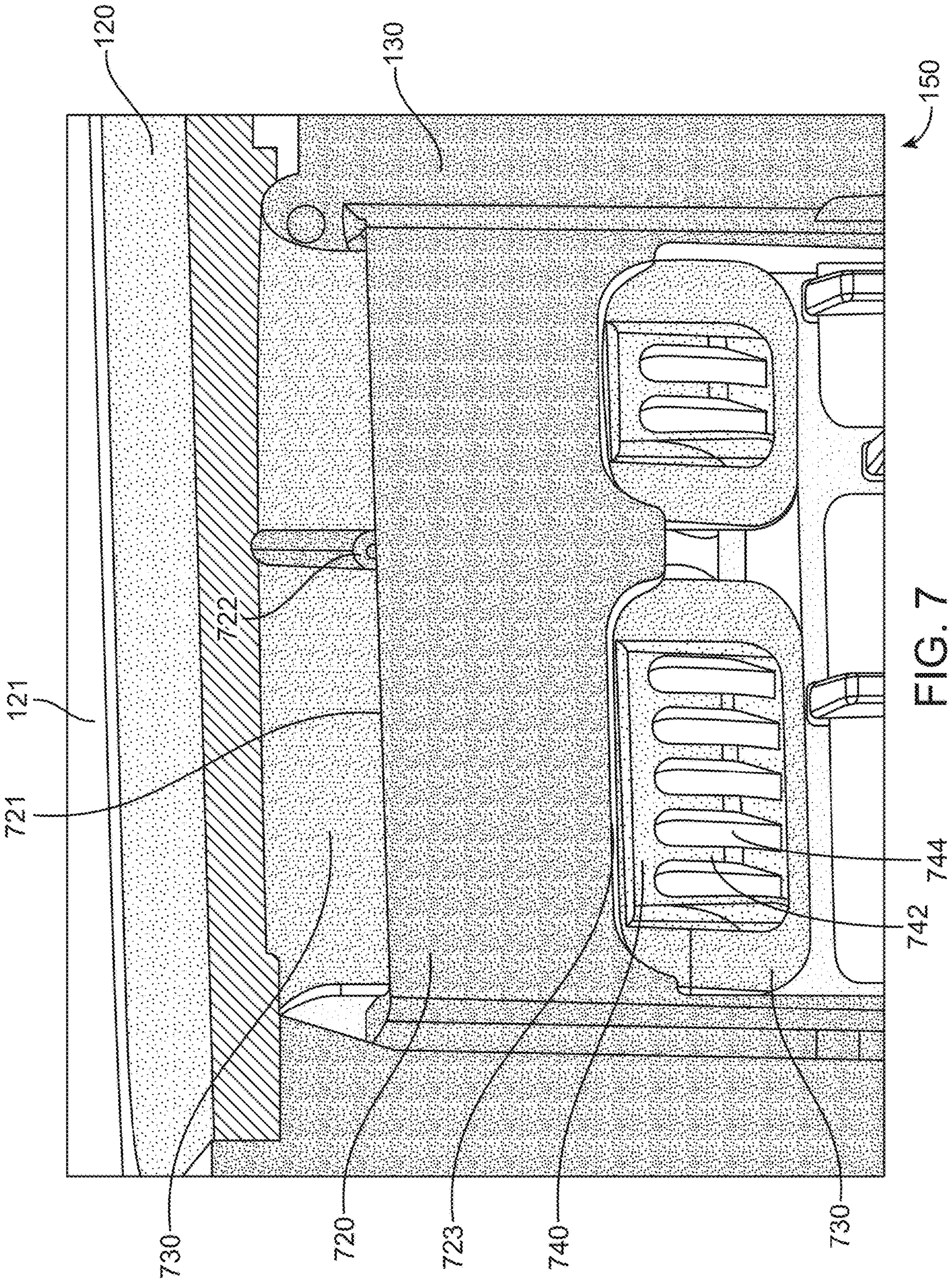
FIG. 7 illustrates a portion of an enclosure according to an embodiment of the present invention.

FIG. 7 illustrates a portion of an enclosure according to an embodiment of the present invention. Enclosure 150 can include top portion 120 and bottom portion 130. Top portion 120 can include a number of snaps 730 extending from top surface 121. Snaps 730 can terminate in tabs 740. Tabs 740 can include reinforcing features such as raised portions 742 around recesses 744. Snaps 730 can fit in hoops 720. Hoops 720 can be formed along an inside surface of bottom portion 130 of enclosure 150. During assembly, top portion 120 can be mated with bottom portion 130 to form the completed enclosure 150. Snaps 730 can enter a top 721 of hoops 720. Top portion 120 can be lowered to mate with bottom portion 130. This action can push snaps 730 through hoops 720 such that tabs 740 emerge from bottoms 723 of hoops 720. Tabs 740 can help to prevent snaps 730 from being extracted from hoops 720. This can help to keep power adapter 100 sealed in enclosure 150. To further secure snaps 730 in place in hoops 720, one or more sides of snaps 730 or hoops 720 can be at least partially coated with an adhesive.

Figure 8:
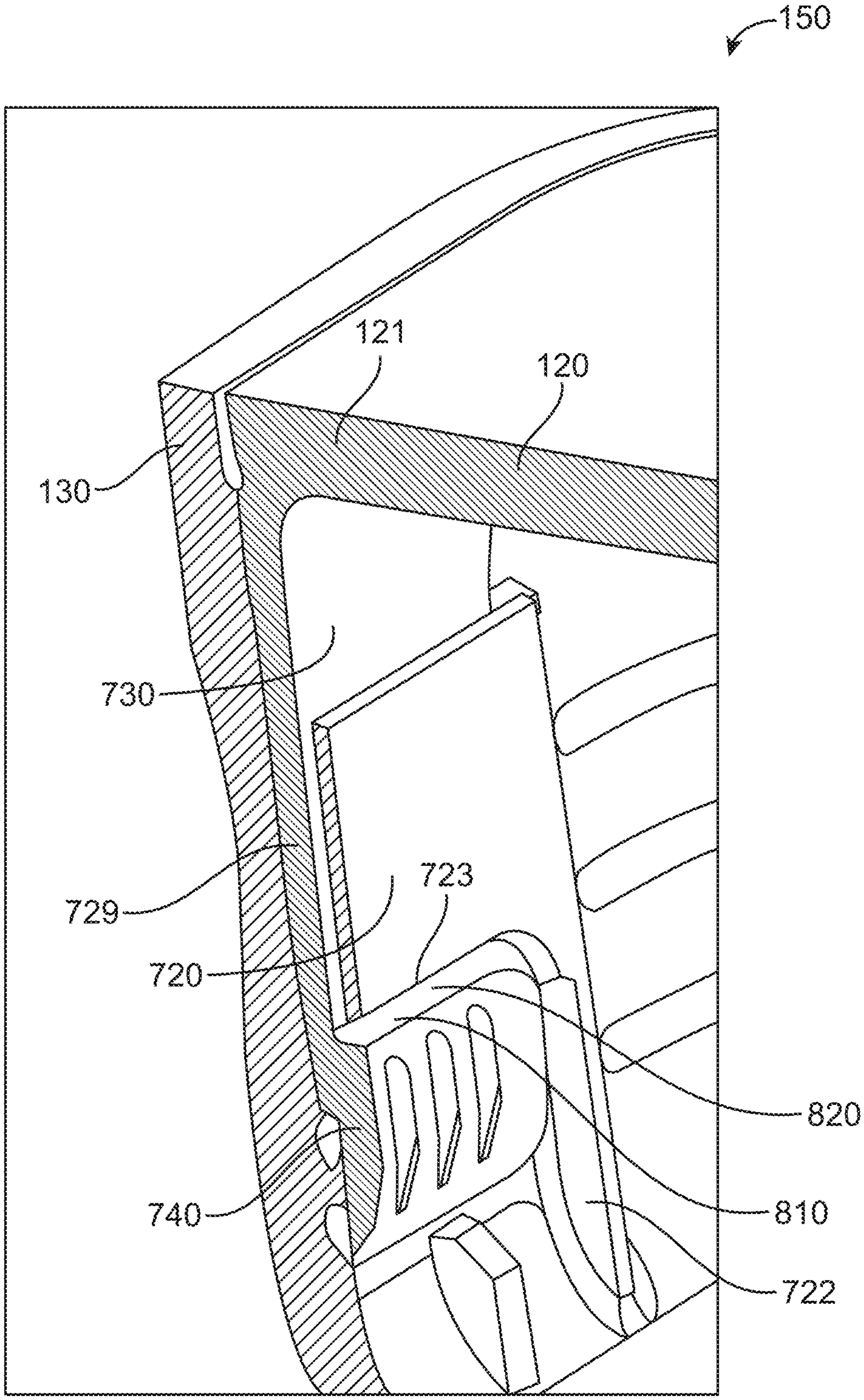
FIG. 8 illustrates a cutaway side view of a portion of an enclosure according to an embodiment of the present invention.

FIG. 8 illustrates a cutaway side view of a portion of an enclosure according to an embodiment of the present invention. Enclosure 150 can include top portion 120 and bottom portion 130. Snaps 730 can extend from top surface 121 of top portion 120. Snaps 730 can fit in hoops 720, which can be formed along and inside surface of bottom portion 130. Snaps 730 can fit in passage 729 of hoops 720. Snaps 730 can include tabs 740. Tab 740 can include top surface 810 can help to prevent snaps 730 from being pulled out of hoops 720. Specifically top surface 810 can encounter bottom 723 of hoop 720, thereby limiting the travel of snap 730. A clearance 820 can be provided between top surface 810 of tabs 740 and bottom 723 of hoops 720. This clearance can ensure that tab 740 exits bottom 723 of hoops 720 during assembly. Sidewalls 722 can attach hoops 720 to an inside surface of bottom portion 130.

In these and other embodiments of the present invention, power prongs 110 can be fixed to top portion 120 of enclosure 150, while first board 280 and related components can be fixed to bottom portion 130 of enclosure 150. When top portion 120 of enclosure 150 is mated with bottom portion 130 of enclosure 150, it can be difficult to ensure a connection between power prongs 110 and components fixed to first board 280. Conventionally, long wires can be used to form such connections. These long wires can then be folded into power adapter 100 during assembly. But this can be difficult for an assembler to complete without pinching wires between structures during assembly, and the folded wires can consume a large amount of space in power adapter 100. Accordingly, embodiments of the present invention can provide space-saving features to connect power prongs 110 to components associated with first board 280. These features can be somewhat rigid, which can simplify the assembly process. Though they are somewhat rigid, they can have a compliance that can help to ensure a connection between power prongs 110 and components fixed to first board 280 as top portion 120 is mated with bottom portion 130. An example is shown in the following figures.

Figure 9:
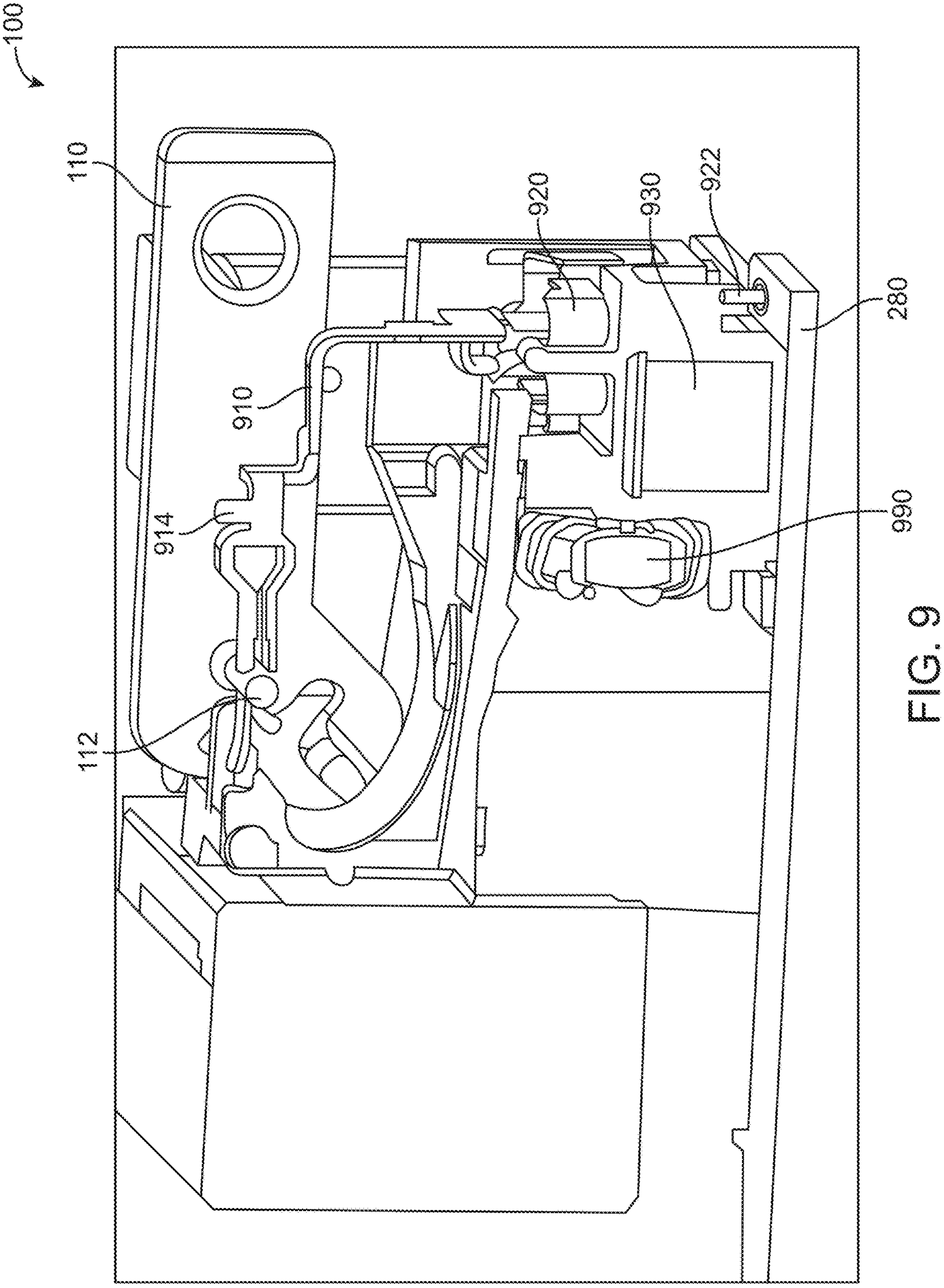
FIG. 9 illustrates a side view of a portion of a power adapter according to an embodiment of the present invention.

FIG. 9 illustrates a side view of a portion of a power adapter according to an embodiment of the present invention. Power adapter 100 can include power prongs 110 and first board 280. First spring contact 910 can power prongs 110 to terminals 920 via terminals 112. Terminals 920 can be supported by header 930, which can be located on a top surface of first board 280. Header 930 can support various components such as coil 990 and can electrically connect to first board 280 through terminals 922.

During assembly, top portion 120 (shown in FIG. 1), power prongs 110, and spring contact 910 can be lowered into bottom portion 130 (shown in FIG. 1.) Bottom portion 130 can support first board 280, header 930, and terminal 920. As top portion 120 is mated with bottom portion 130, spring contact 910 can physically and electrically connect to terminal 920.

There can be manufacturing tolerances associated with the sizes and placements of these structures, such as top portion 120, bottom portion 130, first board 280, header 930, and terminal 920. Accordingly, spring contact 910 can be configured to compensate for these tolerances such that when top portion 120 is properly aligned to bottom portion 130, second end 912 (shown in FIG. 10) of spring contact 910 can be properly seated in terminal 920. That is, the connections between power prongs 110 and spring contacts 910, and between spring contacts 910 and terminal 920 on header 930, can each provide an amount of compliance.

For example, the connection between power prongs 110 and spring contact 910 can be made using terminals 112. Terminals 112 can be attached to or formed as part of power prongs 110 and can electrically connect to spring contacts 910. As power prongs 110 are moved from an up position (extending from top portion 120) to a down position (located with the housing formed by top portion 120 and bottom portion 130), terminals 112 can maintain contact with spring contact 910 and power prongs 110. Spring contact can be anchored in top portion 120 by tab 914. The length between terminals 112 and tab 914 can provide an amount of compliance. Also, spring contact 910 can have sufficient lengths in the lateral direction from tab 914 parallel to first board 280 (the "X" direction as drawn) and the vertical direction orthogonal to first board 280 (the "Z" direction as drawn) such that spring contact 910 is compliant enough between terminal 920 and tab 914 of spring contact 910 to bend and compensate for manufacturing tolerances. Spring contact 910 can be sufficiently thin such that it can twist in order to compensate for manufacturing tolerances in the direction orthogonal to power prong 110 (the "Y" direction as shown.) With the compliance of the connection between power prongs 110 and tabs 914 of spring contacts 910 and the compliance of spring contacts 910 between tabs 914 and their connection to header 930, spring contact 910 can absorb tolerances such that spring contact 910 can be properly seated in terminal 920 when top portion 120 is mated with bottom portion 130.

The multi-directional compliance of spring contacts 910 can provide other benefits as well. Spring contacts 910 or other additional alignment features can also have a compliance that can absorb energy from a physical shock, such as when power adapter 100 is kicked when plugged into a wall outlet. This compliance can give the additional alignment features the ability to absorb energy without breaking internal connections, such as terminal 920, to power prongs 110. Again, these additional alignment features can replace conventional wired connections that can be difficult to implement during assembly. Instead, a somewhat rigid structure that can simplify assembly of the power adapter can be used. Even though they can be somewhat rigid structures, spring contacts 910 can have a compliance or flexibility. Using spring contacts 910 can simplify assembly while providing the compliance necessary to allow proper alignment of power prongs 110 to internal connections such as terminals 920 when power adapter enclosure 150 is assembled and to be able to absorb physical shocks to power adapter 100. Examples further illustrating the assembly of top portion 120 and bottom portion 130 are shown in the following figures.

Figure 10:
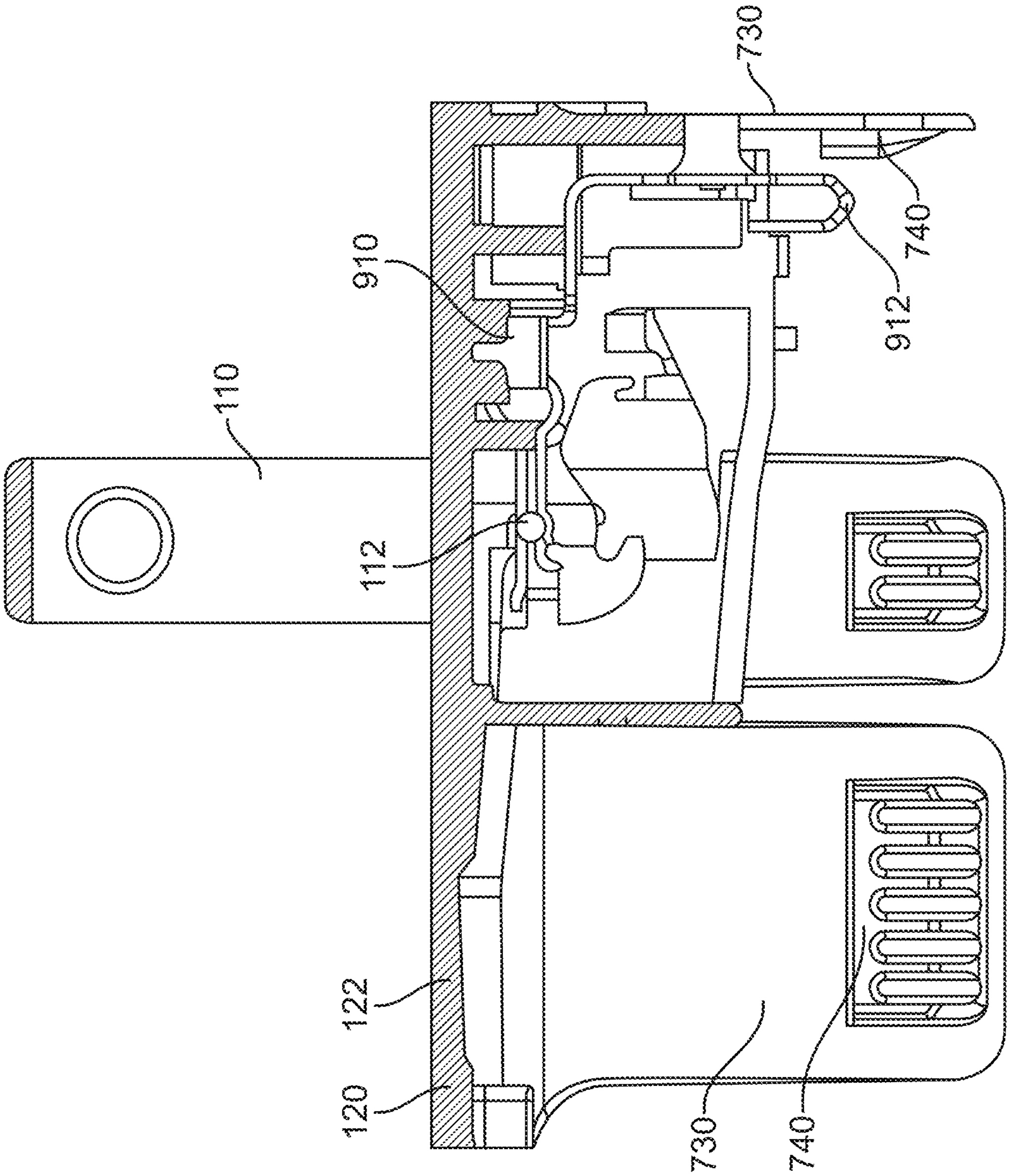
FIG. 10 illustrates a portion of power adapter during assembly according to an embodiment of the present invention.

FIG. 10 illustrates a portion of power adapter during assembly according to an embodiment of the present invention. Top portion 120 can include snaps 730 extending from top surface 121. Snaps 730 can include tabs 740. Tabs 740 can be manufactured as part of snaps 730, or tabs 740 can be manufactured separately and then inserted into openings in snaps 730. Top portion 120 can support power prongs 110, which can include terminals 112. Spring contact 910 can be connected to terminal 112 and can terminate in second end 912.

Figure 11:
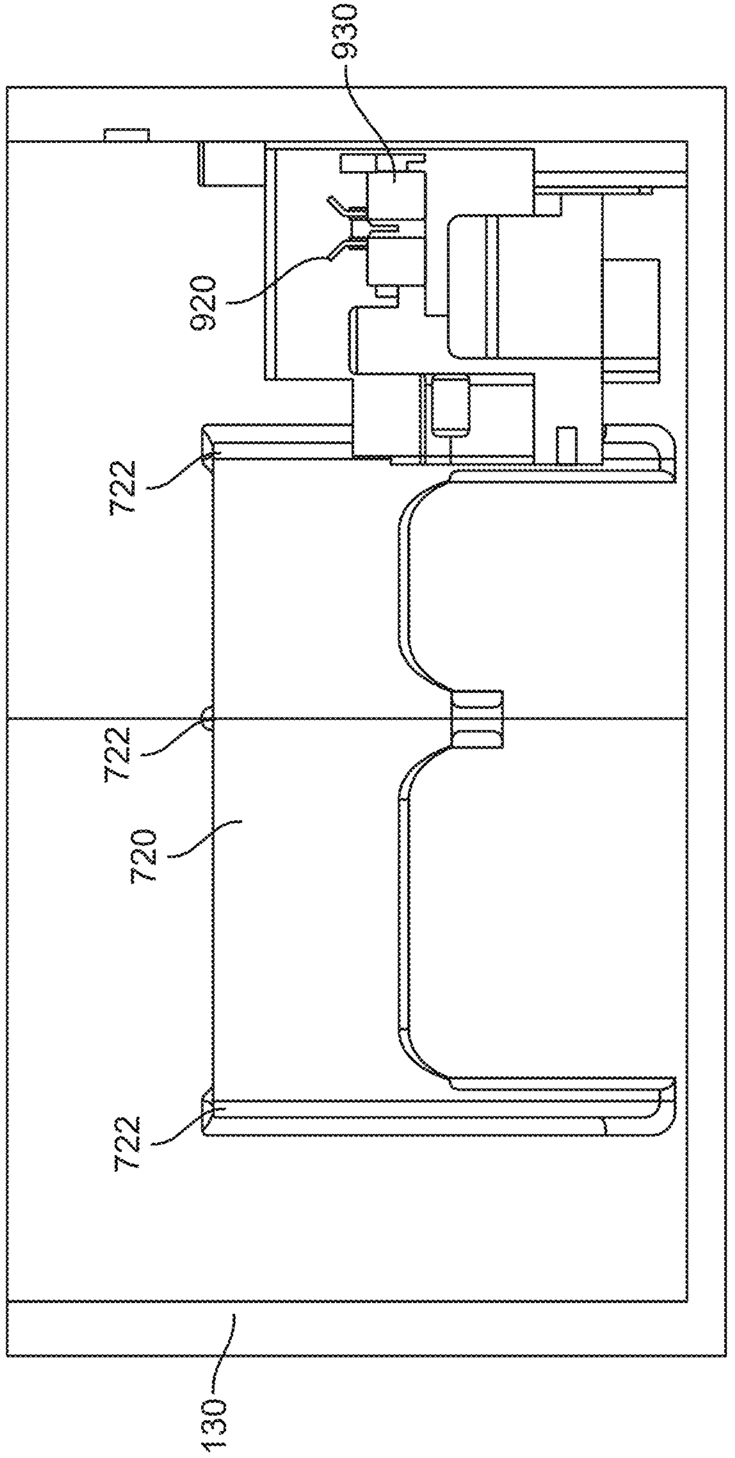
FIG. 11 illustrates a portion of a power adapter during assembly according to an embodiment of the present invention.

FIG. 11 illustrates a portion of a power adapter during assembly according to an embodiment of the present invention. Bottom portion 130 of enclosure 150 (shown in FIG. 1) can include hoops 720. Hoops 720 can extend between sidewalls 722 from an inside surface of bottom portion 130. Hoops 720 can be spaced from the inside surface of bottom portion 130 of enclosure 150 by passages 729 (shown in FIG. 8) and can be connected to the inside surface of bottom portion 130 of enclosure 150 by sidewalls 722. Terminal 920 can be supported by header 930. Terminal 920 can have a dove-tail or funnel-shaped opening.

Figure 12:
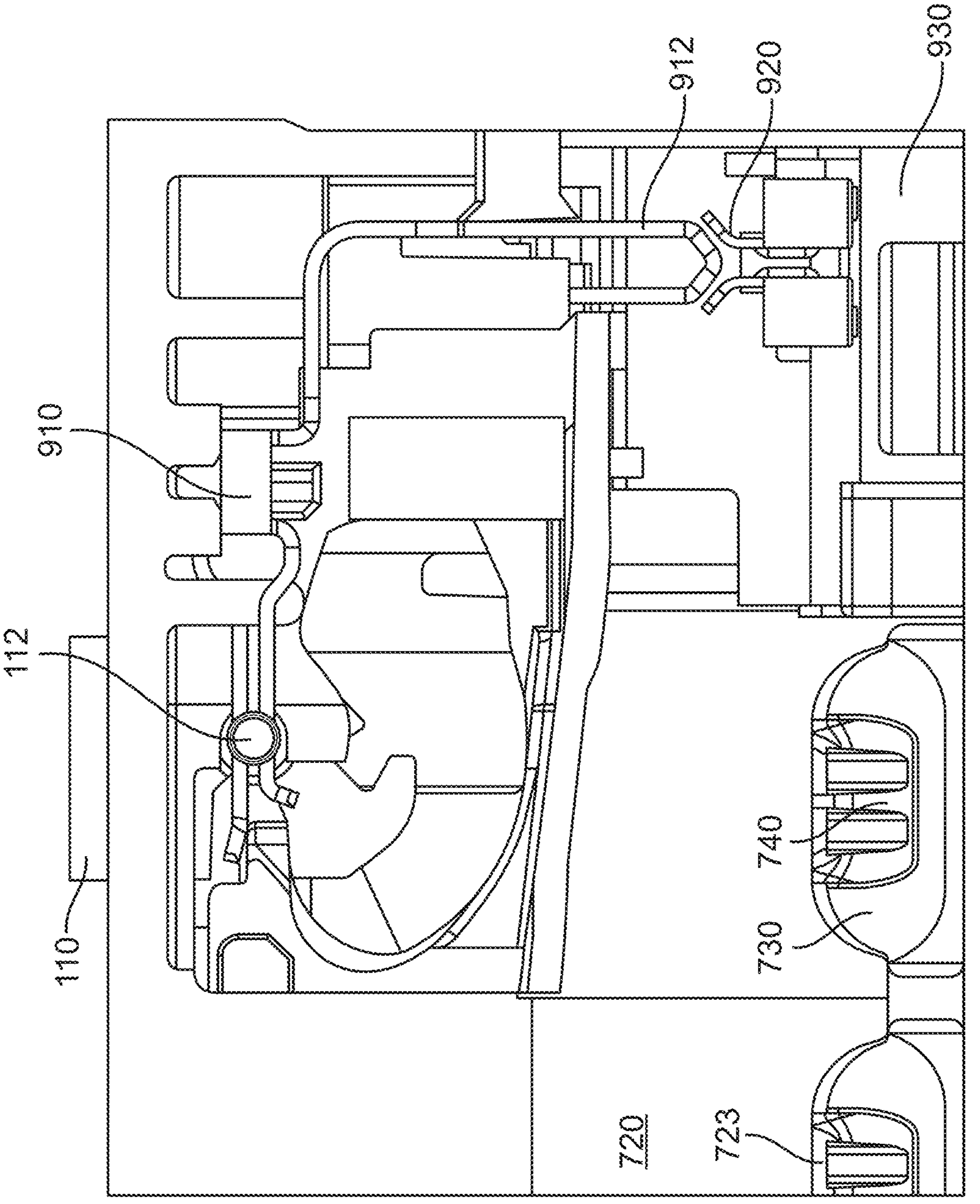
FIG. 12 illustrates a portion of a power adapter during assembly according to an embodiment of the present invention.

FIG. 12 illustrates a portion of a power adapter during assembly according to an embodiment of the present invention. Second end 912 of spring contact 910 is about to be inserted into terminal 920. Second end 912 can include a narrowed portion to fit in dovetailed or funnel-shaped opening of terminal 920. Terminal 920 can be supported by header 930. Spring contact 910 can be connected to terminal 112 of power prong 110. Tabs 740 on snaps 730 are shown as emerging from hoops 720. As top portion 120 is fully engaged with bottom portion 130 of enclosure 150 (all shown in FIG. 1), second end 912 can be mated with terminal 920 without intervention. Tabs 940 can emerge from a bottom 723 of hoops 720. In this example, two spring contacts 910 can form connections between two power prongs 110 and two terminals 920, though only one is shown in this figure for simplicity. In these and other embodiments of the present invention, three or more spring contacts 910 can form connections between three or more power prongs 110 and three or more terminals 920. Also, while second ends 912 of spring contacts 910 are shown as having narrowed portions and terminals 920 are shown as having dovetailed or funnel-shaped openings, terminals 920 can have narrowed portions and second ends 912 of spring contacts 910 can dovetailed or funnel-shaped openings.

During assembly and use of power adapter 100, it can be desirable that spring contacts 910 remain relatively fixed in place relative to the top portion 120. Accordingly, embodiments of the present invention can provide features to secure spring contacts 910 in place. An example is shown in the following figure.

Figure 13:
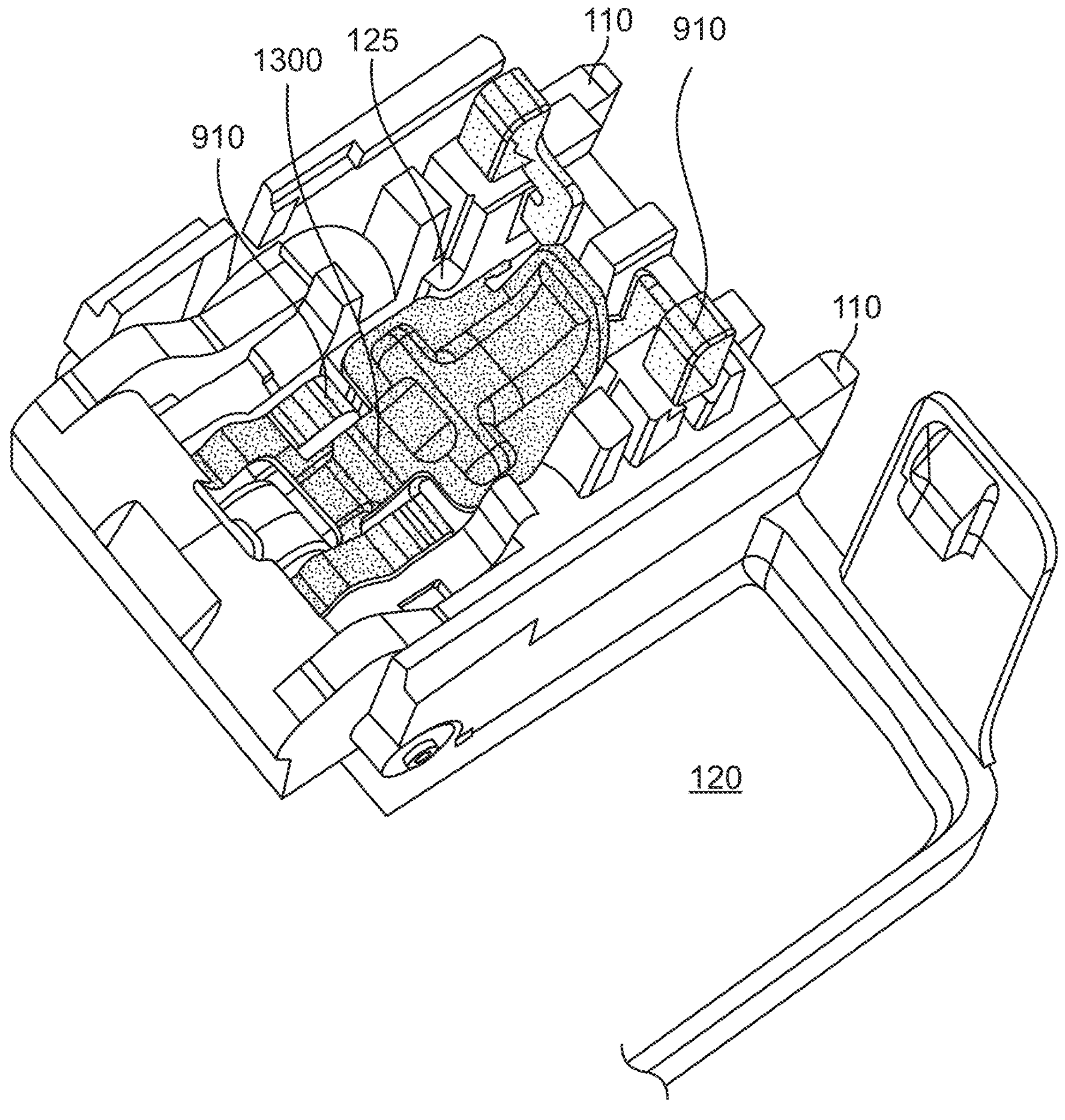
FIG. 13 illustrates a portion of an inside surface of an enclosure according to an embodiment of the present invention.

FIG. 13 illustrates a portion of an inside surface of an enclosure according to an embodiment of the present invention. In this example, top portion 120 can support spring contacts 910 and power prongs 110. Holder 1300 can be placed over spring contacts 910 such that spring contacts 910 are fixed in place between top portion 120 and holder 1300. Holder 1300 can also bias spring contacts 910 against second end 912 (shown in FIG. 12) of power prongs 110. Holder 1300 can be fixed in place by locking or retention features 125, which can be formed on the inside surface of top portion 120. In these and other embodiments of the present invention, holder 1300 can be formed of a material that can maintain form at high temperatures. Holder 1300 can be formed of a nonconductive material such as a thermoplastic that has a high heat-deflection temperature and flammability rating. For example, holder 1300 can be formed of a liquid crystal polymer, polyimide film, polycarbonate film, a thermoset such as a phenolic plastic, or other material.

These and other embodiments of the present invention can provide other space-saving features for power adapter 100. Examples are shown in the following figures.

Figure 14:
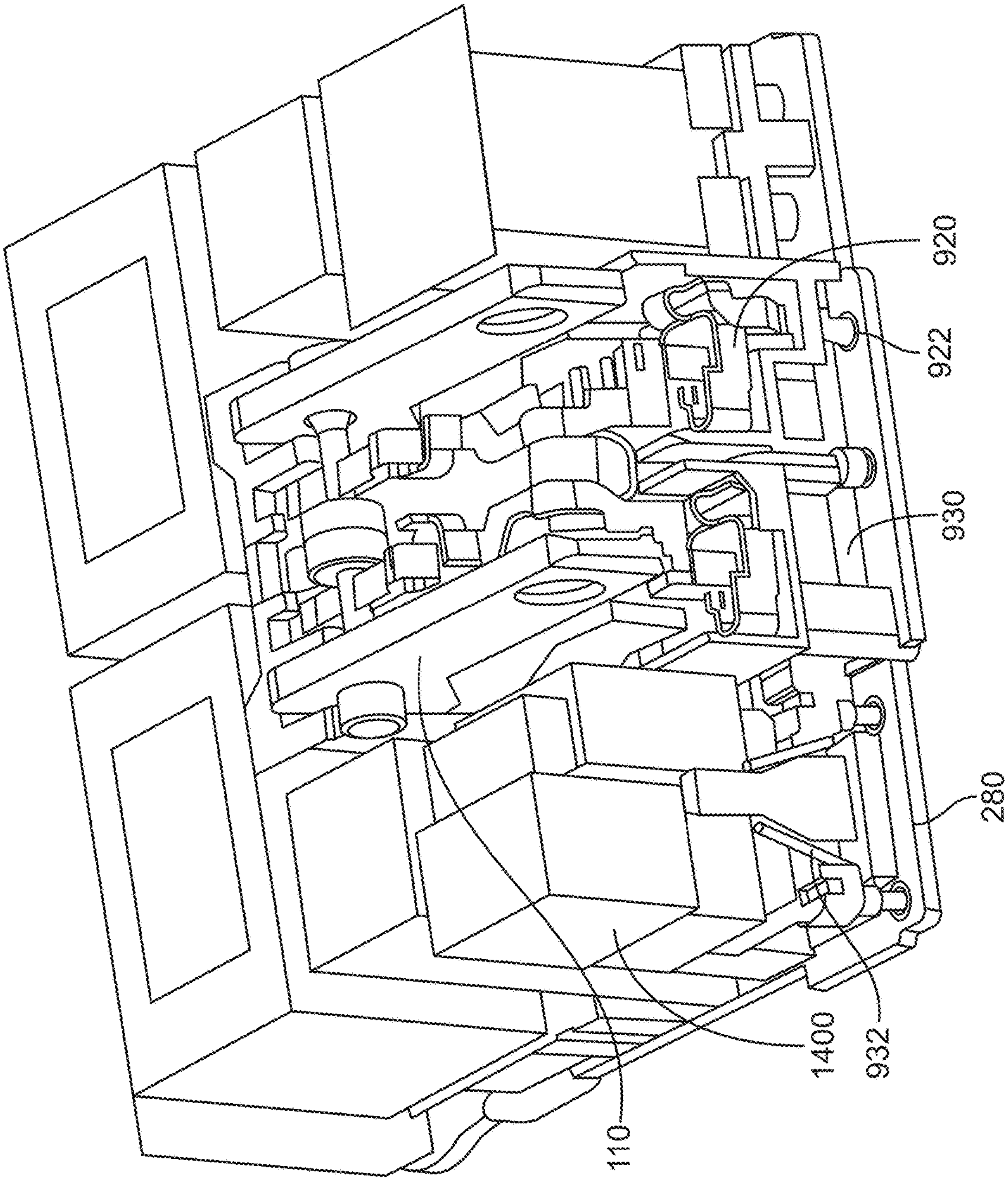
FIG. 14 illustrates interior components of a power adapter according to an embodiment of the present invention.

FIG. 14 illustrates interior components of a power adapter according to an embodiment of the present invention. Power prongs 110 can connect through spring contacts 910 (removed here for clarity but shown in FIG. 13.) Spring contacts 910 can connect to terminals 920 on header 930. Header 930 can be mounted on first board 280. Header 930 can support components 1400. Header 930 can include terminals 922 for making connections to traces on first board 280. Interconnect 932 can be routed on header 930 to connect components 1400 to each other and to terminals 922 and terminals 920. An example of header 930 is shown in the following figure.

Figure 15:
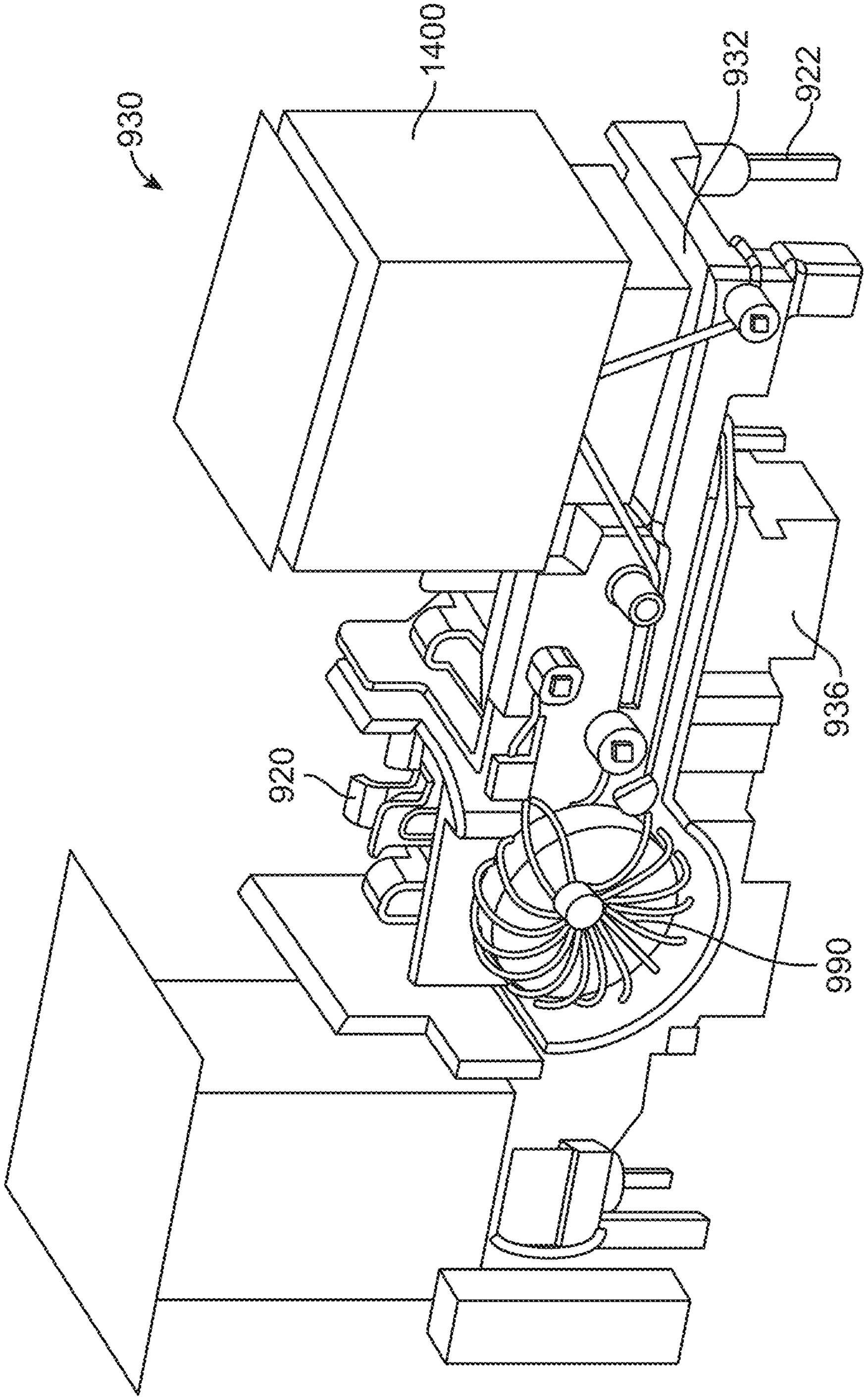
FIG. 15 illustrates a header that can be used in a power adapter according to an embodiment of the present invention.

FIG. 15 illustrates a header that can be used in a power adapter according to an embodiment of the present invention. Header 930 can support one or more components 1400, and one or more terminals 920. Header 930 can also support other components such as coil 990 and fuse 936. Header 930 can connect to first board 280 (shown in FIG. 14) through terminals 922. Header 930 can support interconnect 932, which can be used to connect components 1400 to each other and to terminals 920 and terminals 922. In this arrangement, connections between components 1400 can be made using interconnect 932 on header 930. This avoids the necessity of making these connections through first board 280. This can save space on first board 280, thereby reducing the overall size of power adapter 100. This can also remove power from first board 280, thereby permitting power adapter 100 to provide an increased amount of power at connector receptacles 530 (shown in FIG. 5.)

Components 1400 can be configured to save space in power adapter 100. Examples are shown in the following figures.

Figure 16:
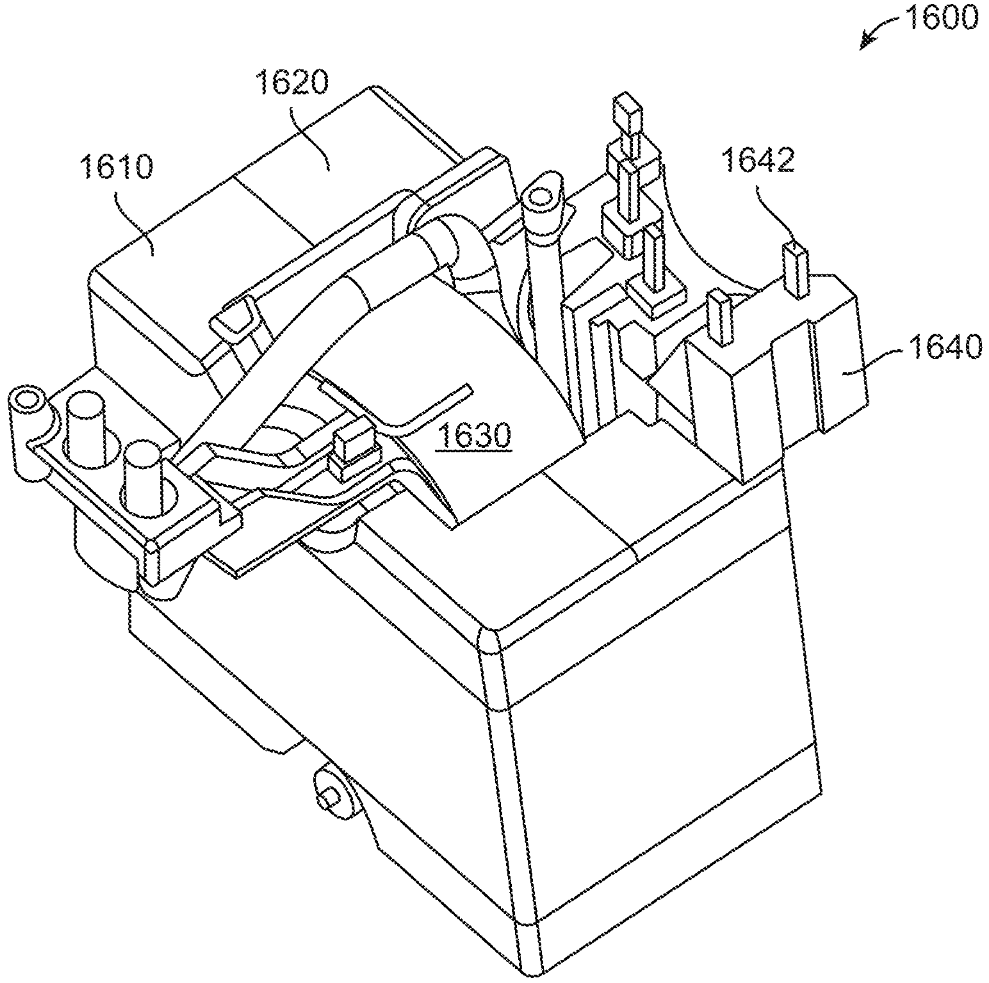
FIG. 16 illustrates a space-saving transformer for use in a power adapter according to an embodiment of the present invention.

FIG. 16 illustrates a space-saving transformer for use in a power adapter according to an embodiment of the present invention. Transformer 1600 can include core 1610 and core 1620 around windings 1630. Windings 1630 can be connected to terminals 1642 at housing 1640. Core 1610 and core 1620 can provide a rectangular cuboid shape for transformer 1600. This shape can provide a space efficient transformer 1600 for use in power adapter 100.

Figure 17:
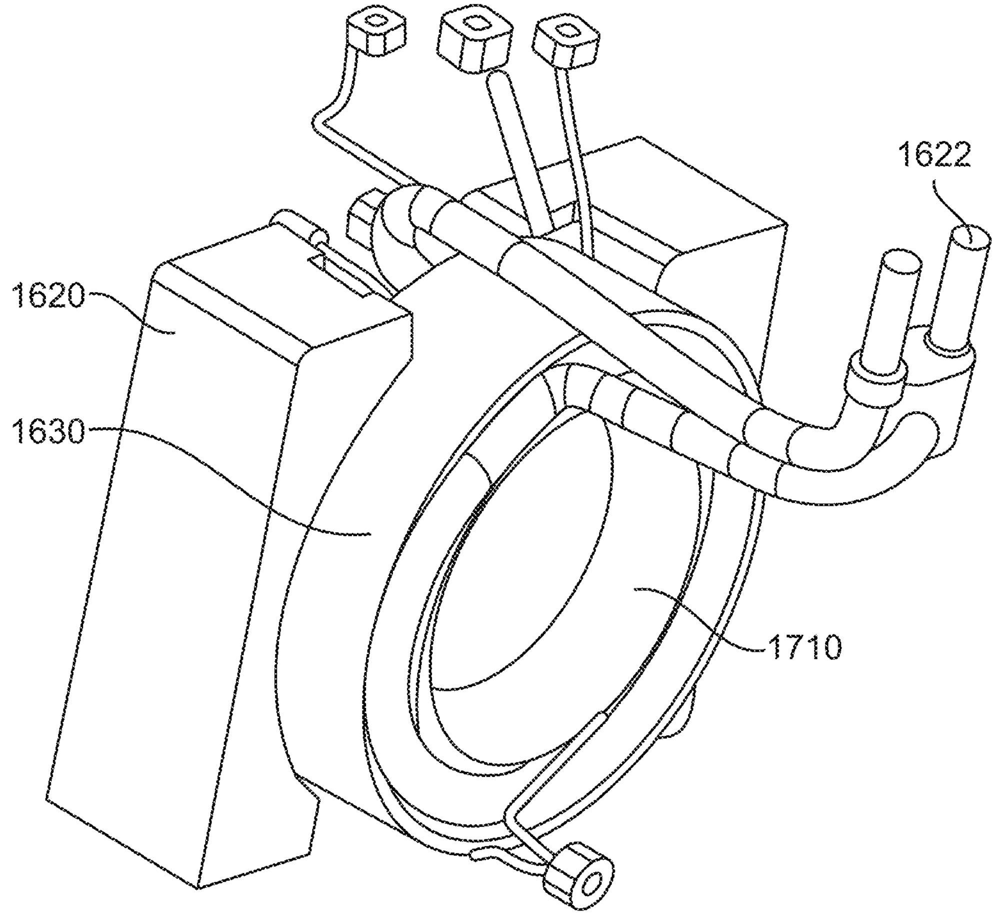
FIG. 17 illustrates a portion of the transformer of FIG. 16.

FIG. 17 illustrates a portion of the transformer of FIG. 16. Core 1620 can be positioned around windings 1630. Windings 1630 can be supported by bobbin 1710. Windings 1630 can terminate in terminals 1622.

In some circumstances, it can be difficult to route terminals 1622 using interconnect 932 on header 930 (both shown in FIG. 9.) Accordingly, embodiments of the present invention can employ one or more bus-bars supported by a housing. This can facilitate the completion of connections to transformer 1600 using interconnect 932. An example is shown in the following figure.

Figure 18:
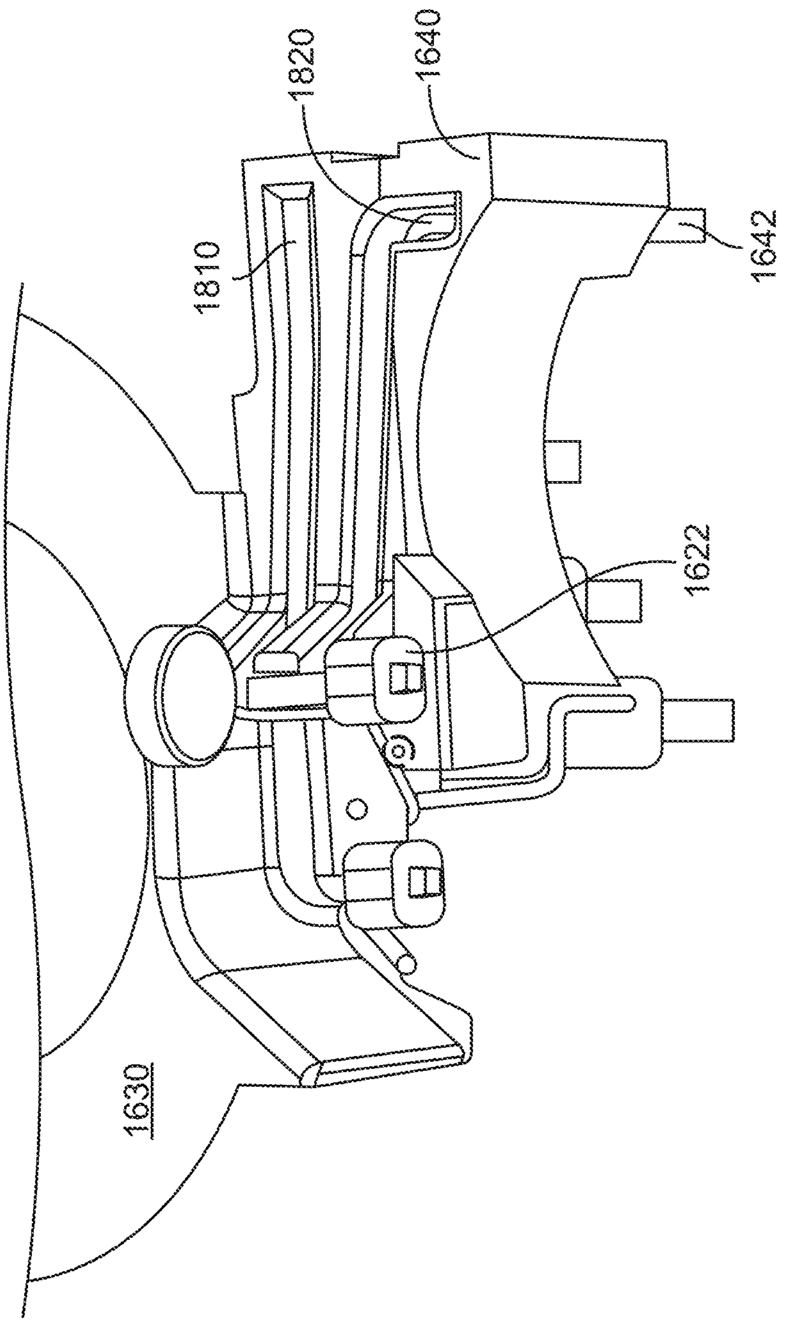
FIG. 18 illustrates a portion of the transformer of FIG. 16.

FIG. 18 illustrates a portion of the transformer of FIG. 16. Windings 1630 can emerge at terminals 1622. Terminals 1622 can be connected to bus-bar 1810 and bus-bar 1820. Bus-bar 1810 and bus-bar 8020 can be supported by housing 1640. Bus-bar 1820 can terminate in terminal 1642.

In these and other embodiments of the present invention, power adapter 100 (shown in FIG. 1) can provide power to multiple devices connected at multiple connector receptacles 530 (shown in FIG. 5.) Power adapter 100 can provide a maximum amount of power without overheating. Accordingly, it can be desirable to allocate this maximum amount of power among multiple electronic devices being charged by power adapter 100. Power adapter 100 can provide power to electronic devices connected at connector receptacles 530. Power adapter 100 can allocate different amounts of power and can allocate the power at different charging voltages.

In these and other embodiments of the present invention, it can be desirable that power be distributed among the connected electronic devices in a consistent manner. For example, power adapter 100 can provide power to a first electronic device and a second electronic device in a consistent manner independent of an order of connection of the first electronic device and the second electronic device to power adapter 100. This is particularly useful when two electronic devices are connected to power adapter 100 and then power adapter 100 is plugged into a wall outlet or other power source.

When allocating power independently of connection order might not be possible, power adapter 100 can prioritize power by order of connection to power adapter 100. This can be useful where two electronic devices that do not have internal batteries are connected to power adapter 100. Since these two electronic devices do not have internal batteries, they might need to be continuously powered by power adapter 100 for proper operation. Power adapter 100 can allocate one-half the maximum power to each of these electronic devices. However, if the two devices combined require more than the maximum power, then power adapter 100 can allocate the needed power to the first connected electronic device and provide the second electronic device with enough power to operate in a low-power state. Where is it not clear which electronic device was connected first, priority can be given to the electronic device connected to a specific one of the connector receptacles 530.

Power adapter 100 can take other factors into account in allocating power among multiple devices. For example, additional power can be directed to a device that has a low battery level and directed away from a device that has a more fully charged battery level.

Power adapter 100 can follow various algorithms in determining how to allocate power among multiple devices connected to connector receptacles 530. These algorithms can be executed on a processor or other device in power adapter 100. For example, when only a first electronic device is connected to power adapter 100, power adapter 100 can check for compliance with a power-delivery communication method. This communication method can be compliant with a known standard or can be a proprietary method. In this and other embodiments of the present invention, the power-delivery communication method can be the universal-serial bus power-delivery standard (USB-PD.) When the first electronic device is USB-PD compliant and is the only connected electronic device, power adapter 100 can offer the first electronic device the maximum power. Power adapter 100 can also request information, such as whether the first electronic device is compliant with the latest version of USB-PD, whether the first electronic device has a battery, and what the charge level on the battery is. Power adapter 100 can also request information as to how much current the first electronic device can request at different power supply levels. The first electronic device can then request the power it needs from power adapter 100, up to the maximum power. When the only the first electronic device is connected and is not USB-PD compliant, power adapter 100 can provide a first amount of power that is less than the maximum power.

Power sharing between two electronic devices can occur when a second electronic device is connected to power adapter 100 along with the first electronic device. If the second device is not USB-PD compliant, the first amount of power can be allocated to the second electronic device. The first amount of power can be an amount of power set by a specification, for example, the USB-PD specification can require that 7.5 Watts be provided at a minimum. The first amount of power can be directed away from the power delivered to the first electronic device to the extent necessary. For example, if the first electronic device was receiving the maximum power, the power delivered to the first electronic device can be reduced by the first amount of power. If the second device is USB-PD compliant, power adapter 100 can offer either the first amount of power or the available power (the power not consumed by the first electronic device), whichever is higher.

If this amount of power is sufficient, then power adapter 100 can continue to provide power to the first electronic device and the second electronic device in this way. If this amount of power is not sufficient, power adapter 100 can determine that a conflict is present. If a conflict is present, then power adapter 100 can determine whether either of the first electronic device or the second electronic device does not have an internal battery. If the first electronic device does not have an internal battery, requests for power from the first electronic device can have priority for power up to the maximum power less the first amount of power. The second electronic device can request power up to the maximum power less the power requested by the first electronic device, and the second device can be assured of receiving at least the first amount of power. Similarly, if the second electronic device does not have an internal battery, requests for power from the second electronic device can have priority for power up to the maximum power less the first amount of power. The first electronic device can request power up to the maximum power less the power requested by the first electronic device, and the first device can be assured of receiving at least the first amount of power. When the first electronic device and the second electronic device both do not have internal batteries, power adapter 100 can allocate one-half the maximum power to each of these electronic devices. However, if the two devices combined require more than the maximum power, then power adapter 100 can allocate the needed power to whichever electronic device was connected first and provide the electronic device that was connected second with enough power to operate in a low-power state. Where is it not clear which electronic device was connected first, for example two devices are connected to power adapter 100 and then power adapter 100 is plugged into an outlet, priority can be given to the electronic device connected to a specific one of the connector receptacles 530. In these examples, when possible, priority is given to a device that does not include an internal battery. When power adapter 100 can't determine whether an internal battery is present, then power adapter 100 can assume that an internal battery is present to avoid giving priority where it is not needed.

If a conflict is present and both the first electronic device and the second electronic device have internal batteries, power adapter 100 can determine whether either the first electronic device or the second electronic device are devices that are charged at a first voltage or a second voltage, the second voltage higher than the first voltage. An electronic device that has a low battery level, for example less than 70, 80, or 90 percent of a full charge, can be charged at the higher, second voltage, while the same device when it has a high battery level, for example greater than 70, 80, or 90 percent of a full charge, can be charged at the lower, first voltage. Alternatively, the electronic device can provide the charge level of its battery to power adapter 100. If both the first electronic device and the second electronic device are charged at the first voltage (or power adapter 100 knows both have a nearly charged battery), or if both the first electronic device and the second electronic device are charged at the second voltage (or power adapter 100 knows both have a low battery level), power adapter 100 can provide each device with up to one-half the maximum power. If only one of either of the first electronic device or second electronic device charge at the first voltage (or power adapter 100 knows it is nearly charged), then power adapter 100 can prioritize providing a second amount of power to that device, where the second amount of power is less than one-half the maximum power and more than the first amount of power. The electronic device that is being charged at the second voltage (power adapter 100 knows it has a low battery level) can receive up to the maximum power less the second amount of power.

In some circumstances, a first electronic device might be the only electronic device connected to power adapter 100, where the first electronic device does not have a battery and requires an amount of power that is more than the maximum power less the first amount of power, but less than the maximum power. While power adapter 100 could provide this power, when a second electronic device connected, power adapter 100 would provide the second electronic device with the first amount of power. This would not leave the first electronic device with sufficient power to operate. In this circumstance, power adapter 100 can provide the first electronic device with the first amount of power, while powering the second electronic device to the extent possible. This can alert a user that power above what power adapter 100 can provide is being requested by the combination of the first electronic device and the second electronic device.

Figure 19:
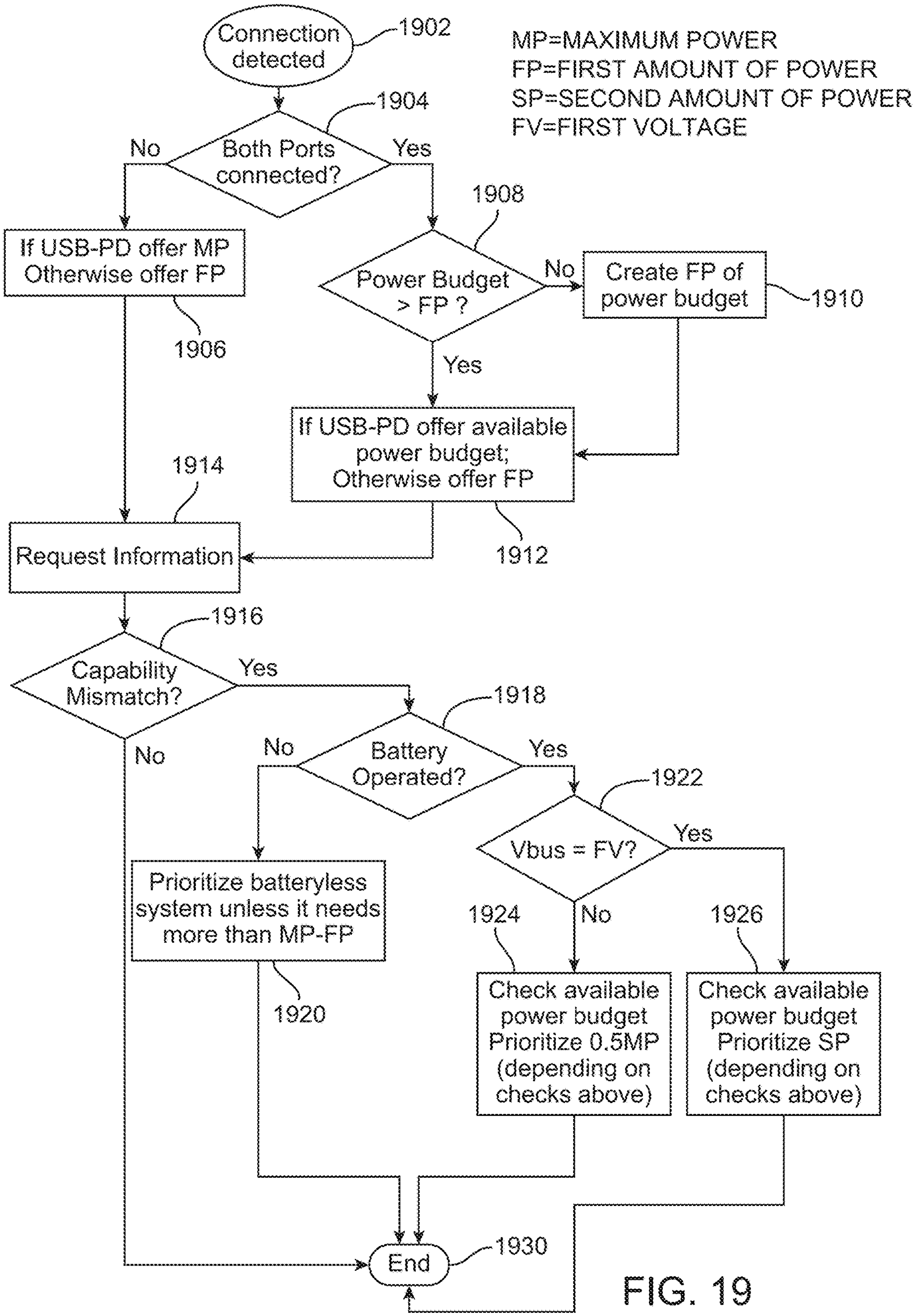
FIG. 19 illustrates a method of allocating power to multiple devices connected to a multiport power adapter according to an embodiment of the present invention.

FIG. 19 illustrates a method of allocating power to multiple devices connected to a multiport power adapter according to an embodiment of the present invention. Specific examples can be applied to FIG. 19 to illustrate these and other embodiments of the present invention.

In a first example, a first electronic device (not shown) can be a laptop that is USB-PD compliant, is charged at the second voltage (that is, has a low battery), and will request the maximum power, can be connected to power adapter 100 (shown in FIG. 1) in act 1902. In act 1904, power adapter 100 can determine whether electronic devices are connected at both connector receptacles 530 (shown in FIG. 5.) If only the first electronic device is connected, then the first electronic device can be provided with up to the maximum power in act 1906. In this example, the first electronic device begins charging at the maximum power. Power adapter 100 can request information from the first electronic device in act 1914. For example, power adapter 100 can request information such as whether the first electronic device is compliant with the latest version of USB-PD, whether the first electronic device has a battery, and what the charge level on the battery is. Power adapter 100 can also request information as to how much current the first electronic device can request at different power supply levels. The first electronic device can then request the power it needs from power adapter 100, up to the maximum power.

A second electronic device (not shown) can be connected to power adapter 100 in act 1902 while the first electronic device remains connected. The second electronic device can be a phone with a nearly charged battery. The second electronic device can be USB-PD compliant and is charged at the first voltage (since it has a nearly charged battery.) In act 1908, power adapter 100 can determine that the first amount of power is not available, and can transfer that charging power from the first electronic device to the second electronic device in act 1910. This first amount of power can be determined by a specification. For example, the USB-PD specifies this to be 7.5 Watts. This power can be offered to the second electronic device in act 1912. Information for the second electronic device can be retrieved in act 1914 and based on that, power adapter 100 can determine in act 1916 that there is a compatibility mismatch.

Power adapter 100 can determine in act 1918 that both devices are battery powered, or to avoid an unnecessary grant of priority, power adapter 100 can assume they have batteries. Since the second electronic device charges at the first voltage (is nearly charged) in act 1922, the second amount of power can be allocated to the second electronic device in act 1926. Alternatively, the second electronic device can provide the charge level of its battery to power adapter 100. The first electronic device being charged at the second voltage (has a low battery level) can be allocated the maximum power less the second amount of power in act 1924. Alternatively, the second electronic device can provide the charge level of its battery to power adapter 100. Once power allocations are complete, the algorithm can end in act 1930.

A second example can be similar in that the first electronic device can be a laptop that is USB-PD compliant, is charged at the second voltage (that is, has a low battery), and will request the maximum power. The second electronic device can again be a phone, but this time with a depleted battery. The second electronic device can be USB-PD compliant and is charged at the second voltage (since it has a low battery level.) In this example, both devices are determined to be charged at the higher voltage in act 1922 and both can be given one-half the maximum power in act 1924.

It should be noted that in the first example, the battery in the second electronic device is nearly charged and is provided with the second amount of power, while in the second example, the battery in the second electronic device is at a low level and is provided with the one-half the maximum power. Since the second amount of power is less than one-half the maximum power, the depleted battery in the second example receives more charging power than the more fully charged battery of the first example.

In a third example, if a first electronic device is connected to power adapter 100 and a second electronic device is then connected, if the second electronic device draws less than the first amount of power, the second electronic device can be given the first amount of power and the first electronic device can be given up to the maximum power less the first amount of power. That is, power adapter 100 can determine in act 1916 that no conflict exists. In these and other embodiments of the present invention, the second electronic device can have the capability of communicating that it needs less than the first amount of power. In this case, power adapter 100 can provide less than the first amount power to the second electronic device and provide the excess (the first amount of power less what the second electronic device requires) to the first electronic device.

In a fourth example, a first electronic device that does not have a battery and requires more than one-half the maximum power to operate, and a second electronic device that does not have a battery and requires more than one-half the maximum power to operate, are both connected to power adapter 100. Power adapter 100 can determine in act 1916 that a conflict exists. Power adapter 100 can determine in act 1918 that both the first electronic device and the second electronic device do not have a battery. In response, the electronic device that was connected first can be provided sufficient power to operate in act 1920, while only the first amount of power is provided to the second electronic device.

In a fifth example, a first electronic device that does not have a battery and requires more than one-half the maximum power to operate, and a second electronic device, are both connected to power adapter 100. Power adapter 100 can determine a conflict in act 1914. In act 1918 power adapter 100 can determine that the first electronic device does not have a battery. In act 1920, power adapter 100 can provide the first electronic device with the power it needs. The remaining power can be provided in act 1924 or act 1926, depending on battery charge level in the second electronic device.

In a sixth example, a first electronic device can be the only electronic device connected to power adapter 100. The first electronic device requires an amount of power that is more than the maximum power less the first amount of power, but less than the maximum power. While power adapter 100 could provide this power, when a second electronic device connected, power adapter 100 would provide the second electronic device with the first amount of power. This would not leave the first electronic device with sufficient power to operate and the first electronic device can change operating mode when second electronic device connects to power adapter 100. To avoid this, power adapter 100 might not provide power to the first electronic device even when the second electronic device is not connected.

In these and other embodiments of the present invention, the maximum power, the first amount of power, the second amount of power and the first voltage can have different values. For example, the maximum power can be 30 Watts, 35 Watts, 40 Watts, or 50 Watts. The first amount of power can be 7.5 Watts, 10 Watts, or other amount of power. Under the USB-PD specification, the first amount of power can be selected from two different powers. The second amount of power can be 10 Watts, 15 Watts, or other amount of power. The second amount of power or second power can be defined by the implemented power policy. The first voltage can be 5 Volts, 9 Volts, or other voltages.

The components of these power adapters 100 can be formed of various materials. For example, power prongs 110, contacts 210, protective cover 240, tab 510, tab 512, spring contacts 910, terminals 920, bus-bar 1810, bus-bar 1820 and their constituent parts and other conductive portions of power adapters 100 can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as enclosure 150, first housing 220, second housing 230, header 930, and their constituent parts and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesives can be a pressure sensitive adhesive, heat activated film, polyimide film, or other adhesive. First board 280, second board 290, and the other boards can be a flexible circuit board or printed circuit board and can be formed of FR-4 or other material.

Embodiments of the present invention can provide power adapters having connector receptacles that can accept connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A power adapter comprising:
a first connector receptacle;
a second connector receptacle;
a plurality of power prongs;
an enclosure for the power adapter, the enclosure having a first opening for the first connector receptacle; a second opening for the second connector receptacle; and a plurality of third openings for the plurality of power prongs;
an alignment adapter electrically between the first connector receptacle and the plurality of power prongs and between the second connector receptacle and the plurality of power prongs, wherein the alignment adapter provides a compensating feature to allow the first connector receptacle to be aligned with the first opening, the second connector receptacle to be aligned with the second opening, and each of the plurality of power prongs to be aligned with corresponding openings in the plurality of third openings; and
a first board and a second board, wherein the alignment adapter comprises a flexible interposer, the flexible interposer comprising a plurality of contacts having a first end for electrically connecting to the first board and a second end for electrically connecting to the second board.

2. The power adapter of claim 1
wherein the compensating feature comprises a first angled portion and a second angled portion on each of the plurality of contacts, where the first angled portion forms a first acute angle and the second angled portion forms a second acute angle.

3. The power adapter of claim 2 wherein for each contact in the plurality of contacts, the first end is orthogonal to the second end.

4. The power adapter of claim 3 wherein the first end of each of the contacts in the plurality of contacts comprises a first through-hole contacting portion and the second end of each of the contacts comprises a second through-hole contacting portion.

5. The power adapter of claim 4 further comprising a first housing around the plurality of contacts and near the first end of each contact in the plurality of contacts such that the first end of each contact extends from the first housing, and a second housing around the plurality of contacts and near the second end of each contact such that the second end of each contact extends from the second housing.

6. The power adapter of claim 5 wherein the first connector receptacle comprises a first tab and a second tab and the second connector receptacle comprises a third tab and a fourth tab, wherein the first tab, the second tab, the third tab, and the fourth tab are positioned against an inside surface of the enclosure to provide reinforcement for the enclosure.

7. The power adapter of claim 6 further comprising a nonconductive layer formed over the plurality of contacts.

8. A power adapter comprising:
an enclosure comprising a top portion and a bottom portion, the bottom portion having a bottom surface and a sidewall extending from the bottom surface to the top portion;
a board in the enclosure and parallel to the bottom surface, the board having a bottom side facing the bottom surface of the bottom portion of the enclosure;
a header on the board and supporting a plurality of first terminals on a bottom side of the header and attached to a top side of the board;
a second terminal attached to a top side of the header;
a first power prong attached to an inside surface of the top portion of the enclosure; and
a first spring contact to connect to the first power prong at a first end and extending to a second end, the second end to connect to the second terminal.

9. The power adapter of claim 8 wherein the second end of the first spring contact and the second terminal are configured such that during assembly, when the top portion of the enclosure is mated with the bottom portion of the enclosure, the second end of the first spring contact physically and electrically connects to the second terminal.

10. The power adapter of claim 8 wherein the second end of the first spring contact and the second terminal are configured such that during assembly, when the top portion of the enclosure is mated with the bottom portion of the enclosure, the second end of the first spring contact physically and electrically connects to the second terminal without intervention.

11. The power adapter of claim 8 wherein the second end of the first spring contact comprises a narrowing portion and the second terminal comprises a dove-tailed opening to accept the narrowing portion of the second end of the first spring contact.

12. The power adapter of claim 8 further comprising:

a third terminal attached to the top side of the header;

a second power prong attached to the inside surface of the top portion of the enclosure; and a second spring contact to connect to the first power prong at a first end and extending to a second end, the second end to connect to the third terminal.

13. The power adapter of claim 12 further comprising:

a holder to secure the first spring contact and the second spring contact in place in the top portion of the enclosure, wherein the holder is formed of thermoplastic.

14. The power adapter of claim 13 wherein the header supports a plurality of components and a plurality of interconnect lines, wherein the plurality of interconnect lines connect the plurality of components, the plurality of first terminals, the second terminal, and the third terminal.

15. The power adapter of claim 14 wherein the plurality of components includes an inductor comprising windings having a toroid shape and a core around the windings, wherein the core has rectangular cuboid outside surface.

16. The power adapter of claim 15 further comprising a housing supporting a bus-bar, wherein a first end of the bus-bar is connected to a wire in the windings and the second end is a terminal connected to an interconnect line on the header.

17. A power adapter comprising:

a connector receptacle;

an enclosure having an opening for the connector receptacle;

a circuit board comprising a plurality of traces; and a flexible interposer comprising a plurality of contacts to form electrical connections between the connector receptacle and the plurality of traces of the circuit board, wherein the flexible interposer includes a compensating feature to allow the connector receptacle to align with the opening, wherein the compensating feature comprises a first angled portion and a second angled portion on each of the plurality of contacts, where the first angled portion forms a first acute angle and the second angled portion forms a second acute angle.

18. The power adapter of claim 17 wherein the circuit board comprising a printed circuit board.

19. The power adapter of claim 18 further comprising a plurality of power prongs.

* * * * *